(12) United States Patent
Qi et al.

(10) Patent No.: US 12,204,690 B2
(45) Date of Patent: Jan. 21, 2025

(54) HAPTICS PANEL AND DRIVING METHOD THEREOF, AND HAPTICS APPARATUS

(71) Applicant: BOE Technology Group Co., Ltd., Beijing (CN)

(72) Inventors: Dexing Qi, Beijing (CN); Yuju Chen, Beijing (CN); Hui Hua, Beijing (CN); Yingzi Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/017,171

(22) PCT Filed: Feb. 22, 2022

(86) PCT No.: PCT/CN2022/077337
§ 371 (c)(1),
(2) Date: Jan. 20, 2023

(87) PCT Pub. No.: WO2023/159362
PCT Pub. Date: Aug. 31, 2023

(65) Prior Publication Data
US 2024/0248535 A1 Jul. 25, 2024

(51) Int. Cl.
*G06F 3/01* (2006.01)
*G06F 3/041* (2006.01)

(52) U.S. Cl.
CPC ............ *G06F 3/016* (2013.01); *G06F 3/041* (2013.01)

(58) Field of Classification Search
CPC ............. G06F 3/016; G06F 3/041; G06F 3/01
See application file for complete search history.

(56) References Cited

U.S. PATENT DOCUMENTS

| | | | | |
|---|---|---|---|---|
| 2009/0284485 A1* | 11/2009 | Colgate | ................. | G06F 3/0362 345/184 |
| 2016/0132115 A1* | 5/2016 | Haga | ..................... | G06F 3/0412 345/173 |
| 2019/0101988 A1* | 4/2019 | Kang | ................... | G06F 3/03547 |
| 2019/0354185 A1* | 11/2019 | Vezzoli | ................... | G06F 3/044 |

* cited by examiner

*Primary Examiner* — Stephen G Sherman
(74) *Attorney, Agent, or Firm* — ArentFox Schiff LLP; Michael Fainberg

(57) ABSTRACT

Embodiments of the present disclosure provide a haptics panel and a driving method thereof, and a haptics apparatus. The driving method includes: receiving a touch signal, and judging a touch position of a user on the haptics panel according to the touch signal; judging a characteristic frequency area to which the touch position belongs; determining characteristic mode displacement field distribution of the base substrate according to the characteristic frequency area to which the touch position belongs, wherein the characteristic mode displacement field distribution contains vibration displacement phase information at each position of the base substrate; dividing a plurality of piezoelectric devices arranged in an array contained in the haptics panel into at least one vibration area according to the vibration displacement phase information of the characteristic mode displacement field distribution; and loading voltage signals on at least part of the piezoelectric devices in the vibration area.

20 Claims, 13 Drawing Sheets

HAPTICS PANEL AND DRIVING METHOD THEREOF, AND HAPTICS APPARATUS

CROSS REFERENCE TO RELATED APPLICATIONS

The present disclosure is a US National Stage of International Application No. PCT/CN2022/077337, filed on Feb. 22, 2022, the entire contents of which are incorporated herein by reference.

FIELD

The present disclosure relates to the technical field of haptics, in particular to a haptics panel and a driving method thereof, and a haptics apparatus.

BACKGROUND

Haptics is the focus of modern science and technology development. Specifically, haptics can make a terminal interact with a human body through touch.

SUMMARY

Embodiments of the present disclosure provide a haptics panel and a driving method thereof, and a haptics apparatus. A specific solution is as follows: an embodiment of the present disclosure provides a driving method of a haptics panel, including: receiving a touch signal, and judging a touch position of a user on the haptics panel according to the touch signal; judging a characteristic frequency area to which the touch position belongs, wherein the characteristic frequency area is one of a variety of characteristic frequency areas into which a base substrate of the haptics panel is divided according to a size of the base substrate of the haptics panel, the base substrate corresponding to the same characteristic frequency area has the same characteristic frequency, and the base substrate corresponding to different characteristic frequency areas has different characteristic frequencies; determining characteristic mode displacement field distribution of the base substrate according to the characteristic frequency area to which the touch position belongs, wherein the characteristic mode displacement field distribution contains vibration displacement phase information at each position of the base substrate; dividing a plurality of piezoelectric devices arranged in an array contained in the haptics panel into at least one vibration area according to the vibration displacement phase information of the characteristic mode displacement field distribution; and loading voltage signals on at least part of the piezoelectric devices in the vibration area, wherein frequencies of the voltage signals loaded in all vibration areas are the same as the characteristic frequency of the base substrate corresponding to the determined characteristic frequency area to which the touch position belongs, phases of the voltage signals loaded in the same vibration area are the same, and phases of the voltage signals loaded in every two adjacent vibration areas are different.

In a possible implementation, in the above driving method provided by the embodiment of the present disclosure, the dividing the plurality of piezoelectric devices arranged in the array contained in the haptics panel into at least one vibration area according to the vibration displacement phase information of the characteristic mode displacement field distribution specifically includes: when it is determined that the vibration displacement phase information at each position of the base substrate has the same vibration displacement direction relative to an initial state of the base substrate, dividing all piezoelectric devices contained in the haptics panel into one vibration area.

In a possible implementation, in the above driving method provided by the embodiment of the present disclosure, the loading the voltage signals on at least part of the piezoelectric devices in the vibration area specifically includes: loading voltage signals with the same voltage amplitudes and phases on all piezoelectric devices in the vibration area.

In a possible implementation, in the above driving method provided by the embodiment of the present disclosure, the dividing the plurality of piezoelectric devices arranged in the array contained in the haptics panel into at least one vibration area according to the vibration displacement phase information of the characteristic mode displacement field distribution specifically includes: when it is determined that the vibration displacement phase information at each position of the base substrate has different vibration displacement directions relative to an initial state of the base substrate, dividing the plurality of piezoelectric devices corresponding to a successive area constituted at positions having the same vibration displacement direction into one vibration area.

In a possible implementation, in the above driving method provided by the embodiment of the present disclosure, the loading the voltage signals on at least part of the piezoelectric devices in the vibration area specifically includes: loading voltage signals with the same phases on at least part of the piezoelectric devices in each vibration area with the same vibration displacement direction, and loading voltage signals with a 180° phase difference on at least part of the piezoelectric devices in each vibration area with different vibration displacement directions.

In a possible implementation, in the above driving method provided by the embodiment of the present disclosure, the voltage signals with the same voltage amplitudes are loaded on all piezoelectric devices in all vibration areas.

In a possible implementation, in the above driving method provided by the embodiment of the present disclosure, each vibration area is divided into a plurality of sub-areas according to a size of vibration displacement, and each sub-area corresponds to different vibration displacement amplitudes; and a voltage signal is loaded on a sub-area with a maximum vibration displacement amplitude in each vibration area.

In a possible implementation, in the above driving method provided by the embodiment of the present disclosure, each vibration area is divided into a plurality of sub-areas according to a size of vibration displacement, and each sub-area corresponds to different vibration displacement amplitudes; and voltage signals with different voltage amplitudes are loaded on each sub-area in one vibration area according to the vibration displacement amplitudes.

In a possible implementation, in the above driving method provided by the embodiment of the present disclosure, voltage signals with decreasing voltage amplitudes step by step are loaded respectively from the sub-area with the maximum vibration displacement amplitude to a sub-area with a minimum vibration displacement amplitude.

Correspondingly, an embodiment of the present disclosure further provides a haptics panel, driven by the above driving method. The haptics panel includes a base substrate, a plurality of piezoelectric devices located on one side of the base substrate and arranged in an array, and a touch layer located on one side of the base substrate facing away from the piezoelectric devices; and the piezoelectric devices are configured to vibrate under drive of voltage signals to drive the base substrate to vibrate.

In a possible implementation, the above haptics panel provided by the embodiment of the present disclosure further includes a supporting layer located on the base substrate, and the supporting layer and the piezoelectric devices are located on the same side of the base substrate.

In a possible implementation, in the above haptics panel provided by the embodiment of the present disclosure, the supporting layer includes first supporting parts located around the base substrate and arranged surrounding all piezoelectric devices.

In a possible implementation, in the above haptics panel provided by the embodiment of the present disclosure, a plurality of first supporting parts are arranged and independent of one another.

In a possible implementation, in the above haptics panel provided by the embodiment of the present disclosure, the first supporting parts include first sub-supporting parts, the first sub-supporting parts are arranged at four corners of the base substrate, and a shape of each first sub-supporting part is an L shape.

In a possible implementation, in the above haptics panel provided by the embodiment of the present disclosure, the first supporting parts further include second sub-supporting parts, and a central area of each side edge of the base substrate is provided with at least one second sub-supporting part.

In a possible implementation, in the above haptics panel provided by the embodiment of the present disclosure, when the central area of each side edge of the base substrate is provided with a plurality of second sub-supporting parts, the plurality of second sub-supporting parts are symmetrically arranged with respect to a central point of each side edge of the base substrate.

In a possible implementation, in the above haptics panel provided by the embodiment of the present disclosure, the supporting layer includes a plurality of second supporting parts arranged at gaps of the piezoelectric devices.

In a possible implementation, in the above haptics panel provided by the embodiment of the present disclosure, a shape of an orthographic projection of the supporting layer on the base substrate includes a square, a triangle, a circle, a trapezoid or a polygon.

In a possible implementation, in the above haptics panel provided by the embodiment of the present disclosure, the first supporting parts are of successive annular structures.

In a possible implementation, in the above haptics panel provided by the embodiment of the present disclosure, a material of the supporting layer includes at least one of the following: rubber, bubble or foam.

In a possible implementation, in the above haptics panel provided by the embodiment of the present disclosure, a material of the supporting layer includes polydimethylsiloxane.

Correspondingly, an embodiment of the present disclosure further provides a haptics apparatus, including the above haptics panel provided by the embodiment of the present disclosure.

DETAILED DESCRIPTION OF THE EMBODIMENTS

Figure 1:
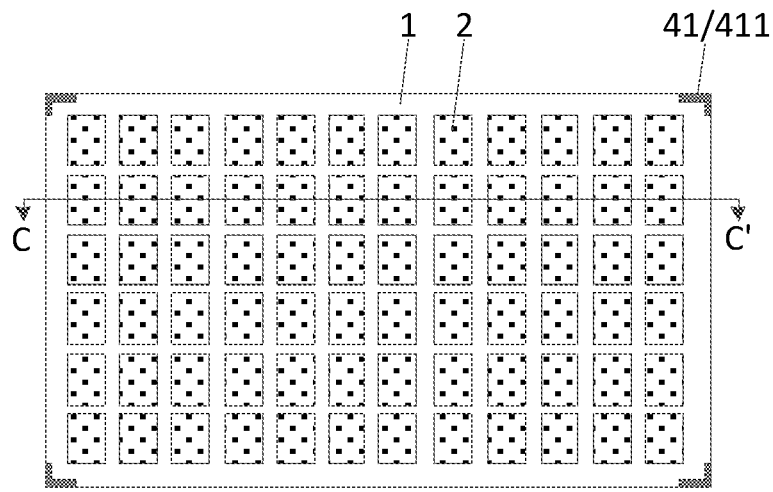
FIG. 1 is a schematic planar diagram of a haptics panel provided by an embodiment of the present disclosure.

To make objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those ordinarily skilled in the art without inventive work shall fall within the protection scope of the present disclosure.

Unless otherwise defined, technical or scientific terms used in the present disclosure shall have the ordinary meanings understood by those ordinarily skilled in the art to which the present disclosure pertains. The words "comprise" or "include" and the like used in the present disclosure indicate that an element or item appearing before such word covers listed elements or items appearing after the word and equivalents thereof, and does not exclude other elements or items. The words "connect" or "couple" or the like are not limited to physical or mechanical connection, but may include electrical connection, whether direct or indirect.

"Inner", "outer", "upper" and "lower" and the like are only used to represent relative position relationships, and the relative position relationships may also change accordingly after an absolute position of a described object changes.

It needs to be noted that the sizes and shapes of all figures in the accompanying drawings do not reflect true scales, and are only intended to schematically illustrate the content of the present disclosure. The same or similar reference numerals represent the same or similar elements or elements with the same or similar functions all the time.

For vibration-based haptic reproduction devices, their working principle is usually to realize touch functions such as virtual keys by pasting piezoelectric sheets, linear motors or piezoelectric films on a base substrate and applying pulse excitation. In a solution adopting the linear motors, since the volume of the linear motors is large, a large internal space of an electronic product may be occupied, resulting in the reduction of the battery volume, thereby shortening the runtime of the product. In a solution adopting the piezoelectric sheets, a voltage amplification apparatus needs to be introduced, on the one hand, the battery space is occupied, and on the other hand, the high voltage may generate potential electric shock risks. In a solution adopting the piezoelectric films, since thickness of the films is usually below 10 μm, the thickness of a device is greatly reduced, the battery space is increased, and the comprehensive runtime of the product is prolonged. In addition, adopting the piezoelectric films does not need high voltages, which ensures the voltage safety of the product. However, because the thickness of the piezoelectric films is too less, it is very difficult to excite the base substrate to generate enough displacement under the condition of an equal electric field, so it is very difficult to make the base substrate generate enough haptics. Therefore, for the haptic reproduction devices adopting the piezoelectric films, a characteristic frequency of the base substrate of the device is generally used to excite large displacement. However, haptics generated by using the characteristic frequency of the base substrate usually can only be concentrated in certain areas, mainly for the reason that displacement field distribution of the base substrate under the characteristic frequency is mainly concentrated in specific areas, and it is very difficult to realize global haptics.

In view of this, an embodiment of the present disclosure provides a driving method of a haptics panel, including:

receiving a touch signal, and judging a touch position of a user on the haptics panel according to the touch signal;

judging a characteristic frequency area to which the touch position belongs, wherein the characteristic frequency area is one of a variety of characteristic frequency areas into which a base substrate of the haptics panel is divided according to a size of the base substrate of the haptics panel, the base substrate corresponding to the same characteristic frequency area has the same characteristic frequency, and the base substrate corresponding to different characteristic frequency areas has different characteristic frequencies;

determining characteristic mode displacement field distribution of the base substrate according to the characteristic frequency area to which the touch position belongs, wherein the characteristic mode displacement field distribution contains vibration displacement phase information at each position of the base substrate;

dividing a plurality of piezoelectric devices arranged in an array and contained in the haptics panel into at least one vibration area according to the vibration displacement phase information of the characteristic mode displacement field distribution; and loading voltage signals are loaded on at least part of the piezoelectric devices in the vibration area, wherein frequencies of the voltage signals loaded in all vibration areas are the same as the characteristic frequency of the base substrate corresponding to the determined characteristic frequency area to which the touch position belongs, phases of the voltage signals loaded in the same vibration area are the same, and phases of the voltage signals loaded in every two adjacent vibration areas are different.

According to the above driving method of the haptics panel provided by the embodiment of the present disclosure, first, the base substrate is divided into a variety of characteristic frequency areas, by detecting the touch position of the user (such as a finger) on the haptics panel, the characteristic frequency area to which the touch position belongs is determined, and all piezoelectric devices are divided into at least one vibration area according to the characteristic mode displacement field distribution corresponding to the characteristic frequency area, and then, the voltage signals with frequencies the same as the characteristic frequency of the base substrate corresponding to the determined characteristic frequency area to which the touch position belongs are loaded on at least part of the piezoelectric devices in each vibration area. In this way, when the finger is located at different touch positions, different characteristic modes of the base substrate may be excited by using the piezoelectric devices, so that the finger can feel a strong haptics effect at any position of the haptics panel.

In order to better understand the driving method of the haptics panel provided by the embodiment of the present disclosure, first, a structure of the haptics panel provided by the embodiment of the present disclosure is described below.

Figure 2:
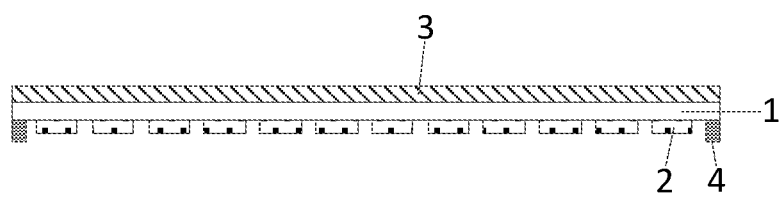
FIG. 2 is a schematic cross-sectional view in a direction CC' of FIG. 1.

An embodiment of the present disclosure provides a haptics panel, as shown in FIG. 1-FIG. 7, where FIG. 1, and FIG. 3-FIG. 7 are several schematic planar diagrams of the haptics panel, and FIG. 2 is a schematic cross-sectional view in a direction CC' in FIG. 1. The haptics panel includes a base substrate 1, a plurality of piezoelectric devices 2 located on one side of the base substrate 1 and arranged in an array, and a touch layer 3 located on one side of the base substrate 1 facing away from the piezoelectric devices 2; and the piezoelectric devices 2 are configured to vibrate under drive of a voltage signal to drive the base substrate 1 to vibrate.

According to the above haptics panel provided by the embodiment of the present disclosure, by adopting a structure integrated with the base substrate 1 and the touch layer 3, a touch function (such as judging a touch position) and a haptic reproduction function may be realized.

During specific implementation, in the above haptics panel provided by the embodiment of the present disclosure, as shown in FIG. 1-FIG. 7, the touch layer 3 is attached to a surface of the base substrate 1, and provides information such as the touch position for a system in a touch process.

During specific implementation, in the above haptics panel provided by the embodiment of the present disclosure, as shown in FIG. 1-FIG. 7, the piezoelectric devices 2 may be piezoelectric films or piezoelectric sheets, and a given voltage signal can directly provide vibration excitation, so that the haptics panel generates a haptics effect.

During specific implementation, in the above haptics panel provided by the embodiment of the present disclosure, as shown in FIG. 1-FIG. 7, the base substrate 1 is a substrate that is in direct contact with touch sense organs such as fingers, which may be a notebook touch panel, a display screen, etc. Specifically, the base substrate 1 may be a substrate made of glass, a substrate made of silicon or silicon dioxide ($SiO_2$), a substrate made of sapphire, or a substrate made of metal wafers, which is not limited here. Those skilled in the art may arrange the base substrate according to actual application needs.

Figure 6:
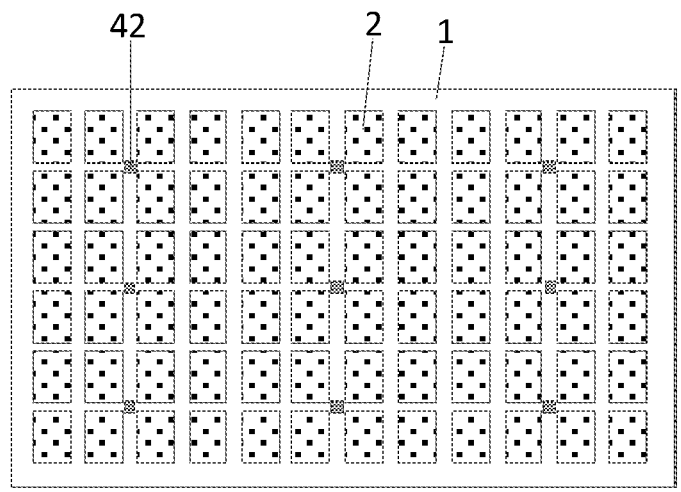
FIG. 6 is a schematic planar diagram of yet another haptics panel provided by an embodiment of the present disclosure.
Figure 7:
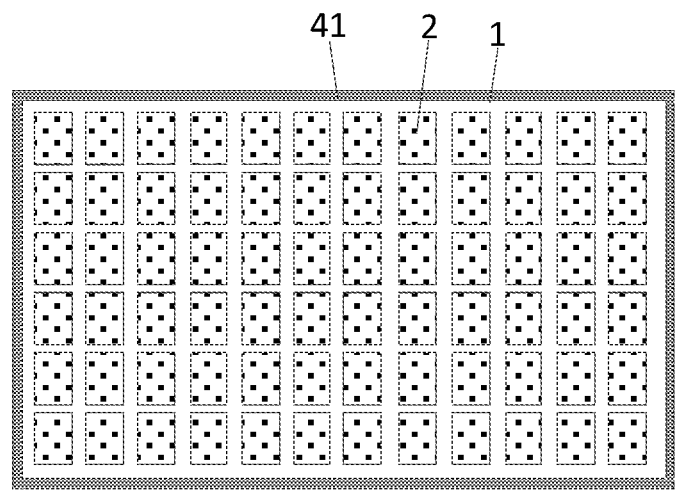
FIG. 7 is a schematic planar diagram of yet another haptics panel provided by an embodiment of the present disclosure.
Figure 8:
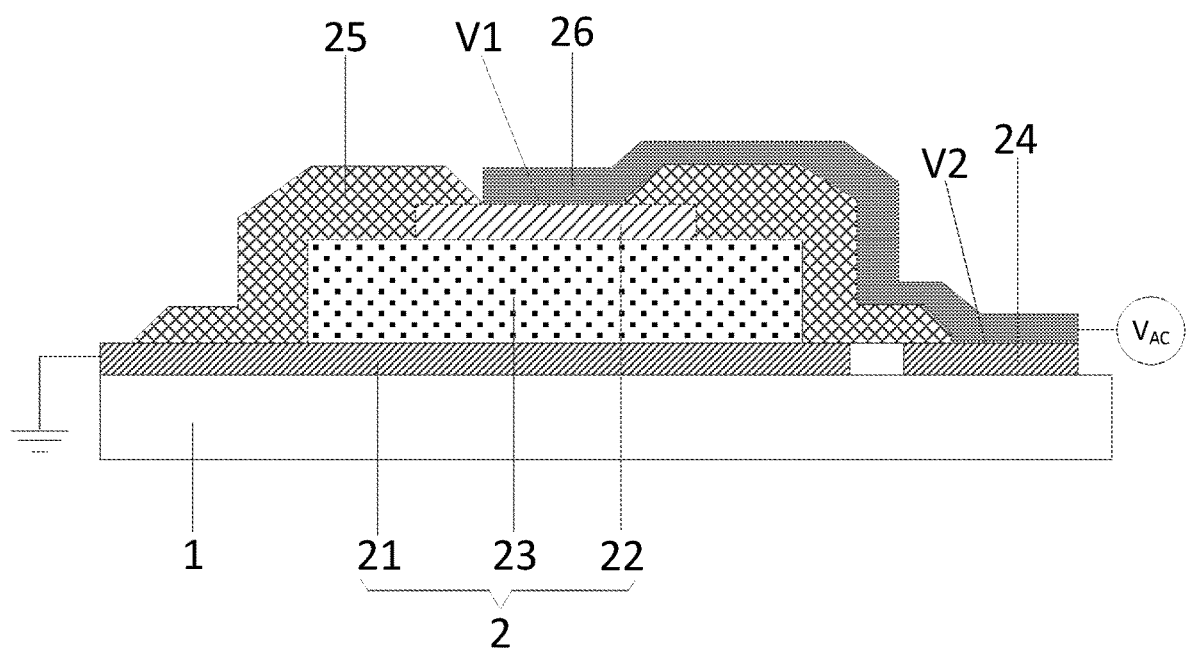
FIG. 8 is a schematic structural diagram of a piezoelectric device provided by an embodiment of the present disclosure.

As shown in FIG. 8, which is a schematic cross-sectional view of one piezoelectric device 2 in FIG. 1-FIG. 7. The piezoelectric device 2 includes a bottom electrode 21 and a top electrode 22 which are arranged oppositely, and a piezoelectric layer 23 located between the bottom electrode 21 and the top electrode 22, the piezoelectric device 2 may further include: a binding electrode 24 arranged on the same layer with the bottom electrode 21, the binding electrode 24 is arranged near an edge of the base substrate 1 and configured to be connected with a drive voltage input end, and a voltage signal input by the drive voltage input end is an alternating current voltage signal; and the piezoelectric device 2 may further include: an insulating layer 25 located on one side of the top electrode 22 facing away from the piezoelectric layer 23, and a wiring layer 26 located one side of the insulating layer 25 facing away from the piezoelectric layer 23.

The insulating layer 25 has a first via hole V1 arranged corresponding to the top electrode 22, one end of the wiring layer 26 is electrically connected with the top electrode 22 through the first via hole V1, and the other end of the wiring layer 26 is electrically connected with the binding electrode 24 through a second via hole V2 penetrating through the insulating layer 25. Specifically, the bottom electrode 21 is grounded, the binding electrode 24 is connected with the drive voltage input end, the voltage signal input by the drive voltage input end is the alternating current voltage signal, the alternating current voltage signal (VAC) is loaded to the top electrode 22 through the drive voltage input end, in this way, an alternating electric field may be formed between the top electrode 22 and the bottom electrode 21, and a frequency of the alternating electric field is the same as a frequency of the alternating current voltage signal. Under the action of the alternating electric field, the piezoelectric layer 23 deforms and generates a vibration signal, and a frequency of the vibration signal is the same as the frequency of the alternating electric field. When the frequency of the vibration signal is close to or equal to a natural frequency of the base substrate 1, the base substrate 1 resonates, the amplitude is increased, and a haptics signal is generated. When the finger touches the surface of the base substrate 1, the change of friction force may be obviously felt. In actual applications, the friction force of the surface of the base substrate 1 may be adjusted through resonance generated between the piezoelectric layer 23 and the base substrate 1, so that the texture reproduction of an object is realized on the surface of the base substrate 1.

In the embodiments, the bottom electrode 21 and the binding electrode 24 may be made of the same material and formed by adopting the same patterning process.

It should be noted that the bottom electrodes 21 of all piezoelectric devices 2 in FIG. 1 and FIG. 3-FIG. 7 may be of patterned structures or whole-surface structures; the piezoelectric layers 23 of all piezoelectric devices 2 are of patterned structures or whole-surface structures; and the top electrodes 22 of all piezoelectric devices 2 are of patterned structures corresponding to the piezoelectric layers 22 one to one.

During specific implementation, a material of the piezoelectric layer may be lead zirconate titanate ($Pb(Zr,Ti)O_3$, PZT), or at least one of aluminum nitride (AlN), zinc oxide (ZnO), barium titanate ($BaTiO_3$), lead titanate ($PbTiO_3$), potassium niobate ($KNbO_3$), lithium niobate ($LiNbO_3$), lithium tantalate ($LiTaO_3$), and lanthanum gallium silicate ($La_3Ga_5SiO_{14}$). Specifically, the material for making the piezoelectric layer may be selected according to the actual use needs of those skilled in the art, which is not limited here. When PZT is used to make the piezoelectric layer, because the PZT has a high piezoelectric coefficient, which ensures piezoelectric characteristics of the corresponding haptics panel, the corresponding haptics panel may be applied to a haptics device, and the PZT has high light transmittance, which will not affect the display quality of a display device when it is integrated into the display device. During specific implementation, the top electrode and the bottom electrode of the piezoelectric device may be made of indium tin oxide (ITO), indium zinc oxide (IZO) or one of a titanium-aurum (Ti—Au) alloy, titanium-aluminum-titanium (Ti—Al—Ti) alloy or titanium-molybdenum (Ti—Mo) alloy, in addition, it may further be made of one of titanium (Ti), aurum (Au), argentum (Ag), molybdenum (Mo), cuprum (Cu), tungsten (W) or chromium (Cr). The above electrodes may be arranged by those skilled in the art according to the actual application needs, which is not limited here.

During specific implementation, the above haptics panel provided by the embodiment of the present disclosure, as shown in FIG. 1-FIG. 7, further includes a supporting layer 4 located on the base substrate 1, and the supporting layer 4 and the piezoelectric devices 2 are located on the same side of the base substrate 1. Specifically, the supporting layer 4 mainly plays the role of connecting the base substrate 1 and a device. The device may be a support frame or a support plate. Specifically, the device mainly plays the role of supporting the haptics panel, and the device may be a border of a display screen, a border of a notebook touch panel and the like. Specifically, the device and the supporting layer 4 may be fixedly connected through an adhesive layer (such as an optical clear adhesive (OCA)).

During specific implementation, in the above haptics panel provided by the embodiment of the present disclosure, as shown in FIG. 1-FIG. 7, a material of the supporting layer 4 may include, but not limited to at least one of the following: rubber, bubble, foam or polydimethylsiloxane (PDMS).

Specifically, the supporting layer 4 and the base substrate 1 may be fixedly connected adopting an adhesive layer (such as an optical clear adhesive (OCA)).

During specific implementation, in the above haptics panel provided by the embodiment of the present disclosure, as shown in FIG. 1, FIG. 3-FIG. 5 and FIG. 7, the supporting layer 4 may include first supporting parts 41 located around the base substrate 1 and arranged surrounding all piezoelectric devices 2.

During specific implementation, in the above haptics panel provided by the embodiment of the present disclosure, as shown in FIG. 1 and FIG. 3-FIG. 5, a plurality of first supporting parts 41 may be arranged and independent of one another.

During specific implementation, in the above haptics panel provided by the embodiment of the present disclosure, as shown in FIG. 1, the first supporting parts 41 include first sub-supporting parts 411, the first sub-supporting parts 411 are arranged at four corners of the base substrate 1, and a shape of each first sub-supporting part 411 is an L shape.

Figure 3:
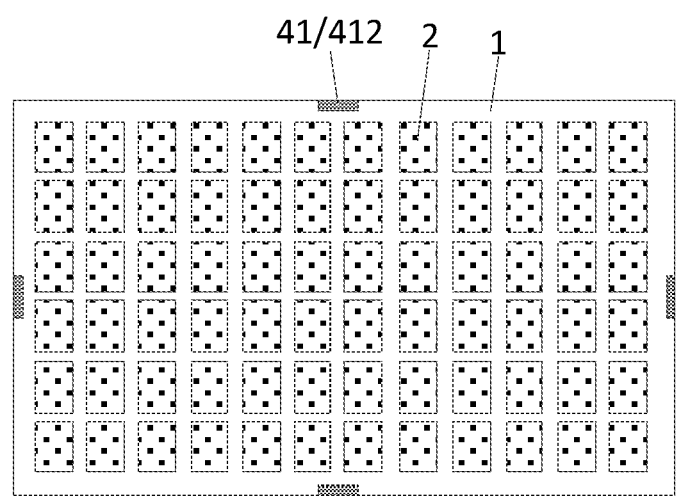
FIG. 3 is a schematic planar diagram of another haptics panel provided by an embodiment of the present disclosure.

During specific implementation, in the above haptics panel provided by the embodiment of the present disclosure, as shown in FIG. 3, the first supporting parts 41 further include second sub-supporting parts 412, and a central area of each side edge of the base substrate 1 is provided with at least one second sub-supporting part 412.

It should be noted that FIG. 3 only shows that the central area of each side edge of the base substrate 1 is provided with the second sub-supporting part 412, and of course, the central area of each side edge of the base substrate 1 may also be provided with the second sub-supporting part 412 on the basis of FIG. 1.

Figure 4:
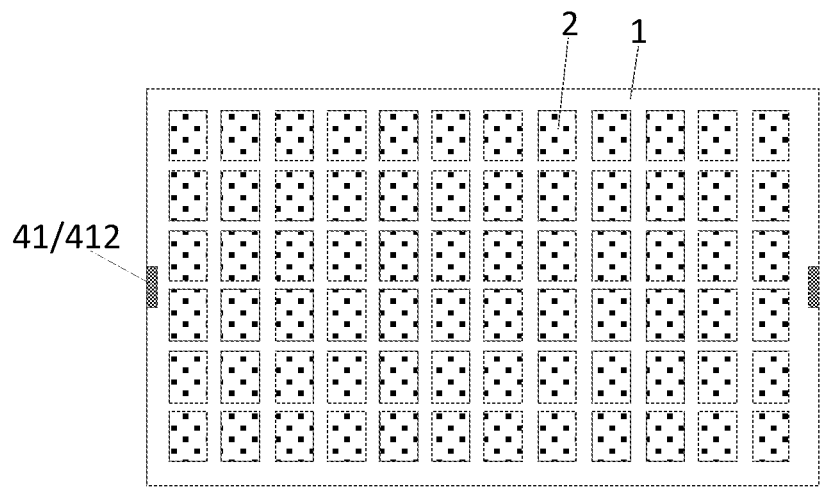
FIG. 4 is a schematic planar diagram of yet another haptics panel provided by an embodiment of the present disclosure.

During specific implementation, in the above haptics panel provided by the embodiment of the present disclosure, as shown in FIG. 4, only the central areas of one group of opposite side edges of the base substrate 1 may further be provided with at least one second sub-supporting part 412, or the central areas of one group of opposite side edges of the base substrate 1 may also be provided with at least one second sub-supporting part 412 on the basis of the structure shown in FIG. 1.

Figure 5:
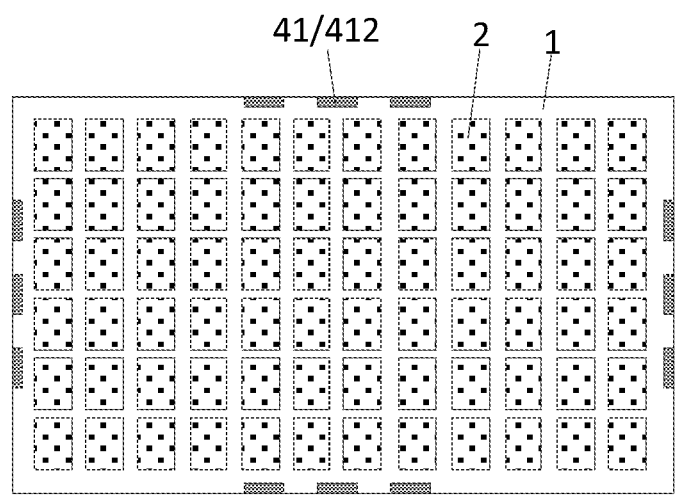
FIG. 5 is a schematic planar diagram of yet another haptics panel provided by an embodiment of the present disclosure.

During specific implementation, in the above haptics panel provided by the embodiment of the present disclosure, as shown in FIG. 5, when the central area of each side edge of the base substrate 1 is provided with a plurality of second sub-supporting parts 412, the plurality of second sub-supporting parts 412 are symmetrically arranged with respect to a central point of each side edge of the base substrate 1.

It should be noted that FIG. 5 only shows that the central area of each side edge of the base substrate 1 is provided with the plurality of second sub-supporting parts 412, and of course, the central area of each side edge of the base substrate 1 may also be provided with the plurality of second sub-supporting parts 412 on the basis of FIG. 1.

During specific implementation, in the above haptics panel provided by the embodiment of the present disclosure, as shown in FIG. 6, the supporting layer 4 includes a plurality of second supporting parts 42 arranged at gaps of the piezoelectric devices 2.

It should be noted that FIG. 6 only shows that the gaps of the piezoelectric devices 2 are provided with a plurality of second supporting parts 42, and of course, the gaps of the piezoelectric devices 2 may also be provided with a plurality of second supporting parts 42 on the basis of FIG. 1, FIG. 3, FIG. 4 or FIG. 5; or the gaps of the piezoelectric devices 2 may also be provided with a plurality of second supporting parts 42 on the basis of a superposition solution of the supporting layer 4 in FIG. 1 and FIG. 3, or the gaps of the piezoelectric devices 2 are provided with a plurality of second supporting parts 42 on the basis of a superposition solution of the supporting layer 4 in FIG. 1 and FIG. 4, or the gaps of piezoelectric devices 2 are provided with a plurality of second supporting parts 42 on the basis of a superposition solution of the supporting layer 4 in FIG. 1 and FIG. 5, and so on.

During specific implementation, in the above haptics panel provided by the embodiment of the present disclosure, as shown in FIG. 3-FIG. 6, a shape of an orthographic projection of the supporting layer 4 (the second sub-supporting parts 412 and the second supporting parts 42) on the base substrate 1 includes a square; and of course, the shape of the orthographic projection of each second sub-supporting part 412 and each second supporting part 42 on the base substrate 1 may further include a triangle, a circle, a trapezoid or a polygon.

During specific implementation, in the above haptics panel provided by the embodiment of the present disclosure, as shown in FIG. 7, the first supporting parts 41 may be of successive annular structures. Optionally, the first supporting parts 41 may also perform deformation settings at other positions as required.

A vibration panel provided by the embodiment of the present disclosure may be applied to the fields of medicine, automotive electronics, motion tracking systems, etc. It is particularly applicable to the field of wearable devices for medical in-vitro or human-body-implanted monitoring and treatment, or electronic skin of artificial intelligence. Specifically, the vibration panel may be applied to brake pads, keyboards, mobile terminals, game handles, vehicles, smart homes and other vibration panels that may generate vibration and mechanical properties.

Taking the haptics panel shown in FIG. 3 as an example, a driving method of the haptics panel provided by the embodiment of the present disclosure is described in detail below.

Figure 9:
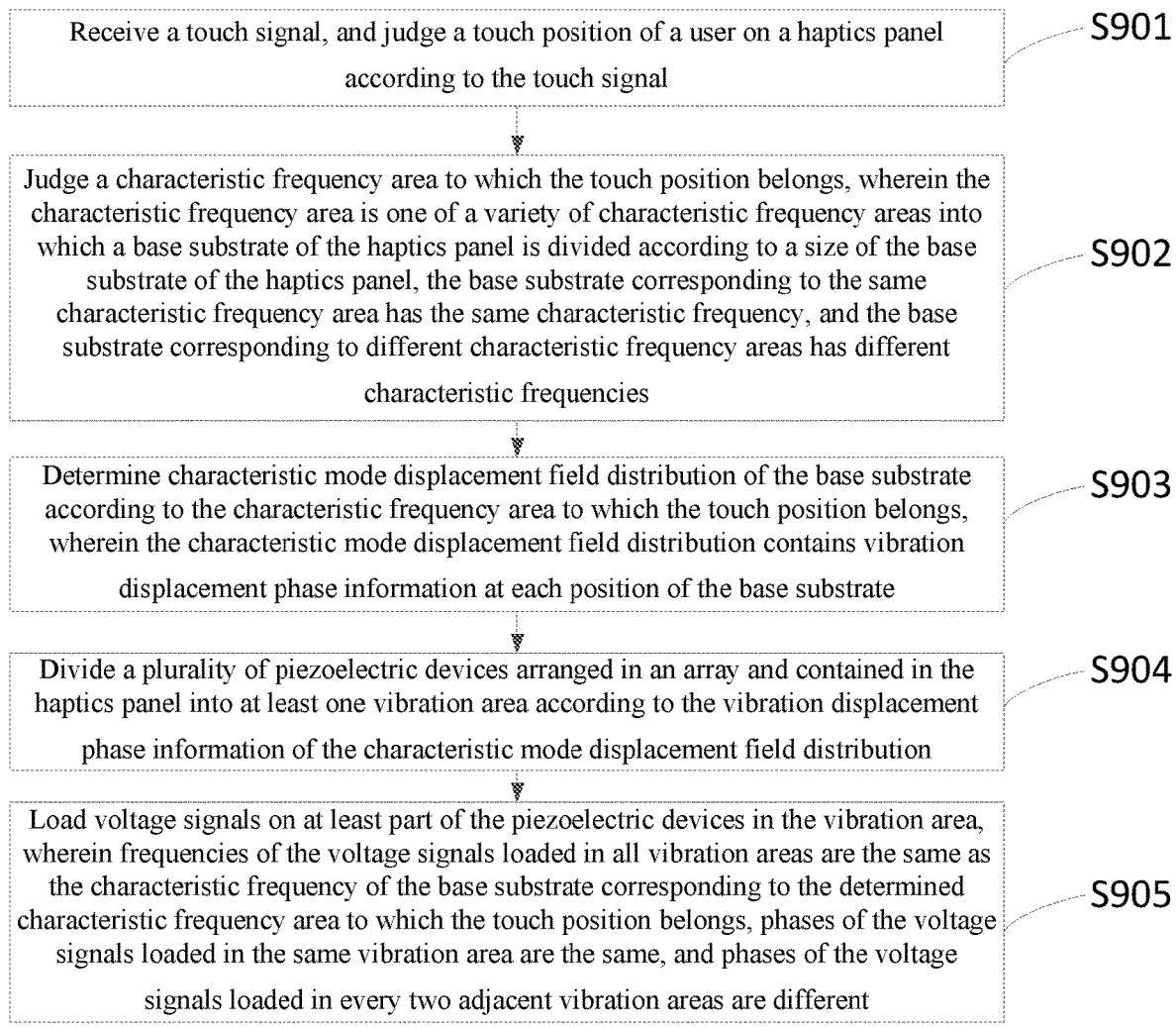
FIG. 9 is a schematic flow chart of a driving method of a haptics panel provided by an embodiment of the present disclosure.

An embodiment of the present disclosure provides a driving method of the haptics panel, as shown in FIG. 9, including S901 to S905.

S901, a touch signal is received, and a touch position of a user on the haptics panel is judged according to the touch signal.

S902, a characteristic frequency area to which the touch position belongs is judged, wherein the characteristic frequency area is one of a variety of characteristic frequency areas into which a base substrate of the haptics panel is divided according to a size of the base substrate of the haptics panel, the base substrate corresponding to the same characteristic frequency area has the same characteristic frequency, and the base substrate corresponding to different characteristic frequency areas has different characteristic frequencies.

S903, characteristic mode displacement field distribution of the base substrate is determined according to the characteristic frequency area to which the touch position belongs, wherein the characteristic mode displacement field distribution contains vibration displacement phase information at each position of the base substrate.

S904, a plurality of piezoelectric devices arranged in an array and contained in the haptics panel are divided into at least one vibration area according to the vibration displacement phase information of the characteristic mode displacement field distribution.

S905, voltage signals are loaded on at least part of the piezoelectric devices in the vibration area, wherein frequencies of the voltage signals loaded in all vibration areas are the same as the characteristic frequency of the base substrate corresponding to the determined characteristic frequency area to which the touch position belongs, phases of the voltage signals loaded in the same vibration area are the same, and phases of the voltage signals loaded in two adjacent vibration areas are different.

According to the above driving method of the haptics panel provided by the embodiment of the present disclosure, first, the base substrate is divided into a variety of characteristic frequency areas, by detecting the touch position of the user (such as a finger) on the haptics panel, the characteristic frequency area to which the touch position belongs is determined, and all piezoelectric devices are divided into at least one vibration area according to the characteristic mode displacement field distribution corresponding to the characteristic frequency area, and then, the voltage signals with frequencies the same as the characteristic frequency of the base substrate corresponding to the determined characteristic frequency area to which the touch position belongs are loaded on at least part of the piezoelectric devices in each vibration area. In this way, when the finger is located at different touch positions, different characteristic modes of the base substrate may be excited by using the piezoelectric devices, so that the finger can feel a strong haptics effect at any position of the haptics panel.

Figure 10:
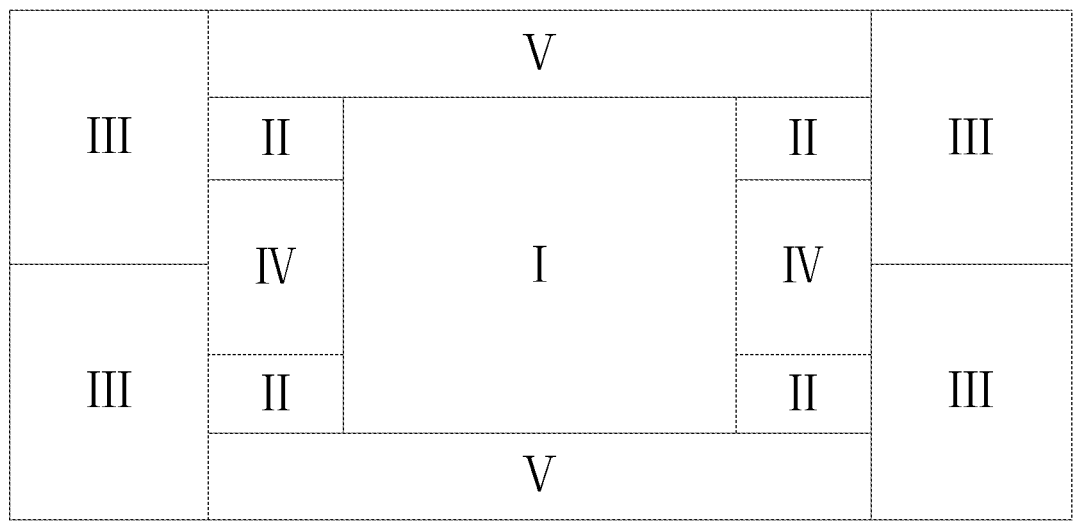
FIG. 10 is a schematic partition diagram of a base substrate provided by an embodiment of the present disclosure.

During specific implementation, the base substrate is divided into a variety of characteristic frequency areas according to the size of the base substrate, and may be partitioned according to the displacement field distribution of the base substrate under different characteristic modes, which specifically may be obtained through software fitting calculation or experiment. Taking a glass base substrate with a length, width and height of 117 mm*61 mm*0.5 mm as an example, the embodiment of the present disclosure may divide the base substrate of this size into 5 characteristic frequency areas, as shown in FIG. 10, the 5 characteristic frequency areas are represented by labels I, II, III, IV and V respectively, the base substrate 1 corresponding to the same characteristic frequency area has the same characteristic frequency, and the base substrate 1 corresponding to different characteristic frequency areas has different characteristic frequencies. As shown in FIG. 11A-FIG. 11E, which are characteristic modes of the base substrate 1 corresponding to the five characteristic frequency areas I, II, III, IV and V in FIG. 10 respectively, and an orientation of an arrow H in FIG. 11A-FIG. 11E represents a vibration displacement amplitude of the base substrate 1 from 0 to a maximum value.

During specific implementation, in the above driving method provided by the embodiment of the present disclosure, as shown in FIG. 10, the quantity of each characteristic frequency area is one or more, for example, the quantity of the area I is one, the quantity of the area II is four, the quantity of the area III is four, the quantity of the area IV is two, and the quantity of the area V is two.

Specifically, structures constituted by the five characteristic frequency areas I, II, III, IV and V in FIG. 10 correspond to the shapes of the base substrate 1 in FIG. 11A-FIG. 11E.

Figure 11A:
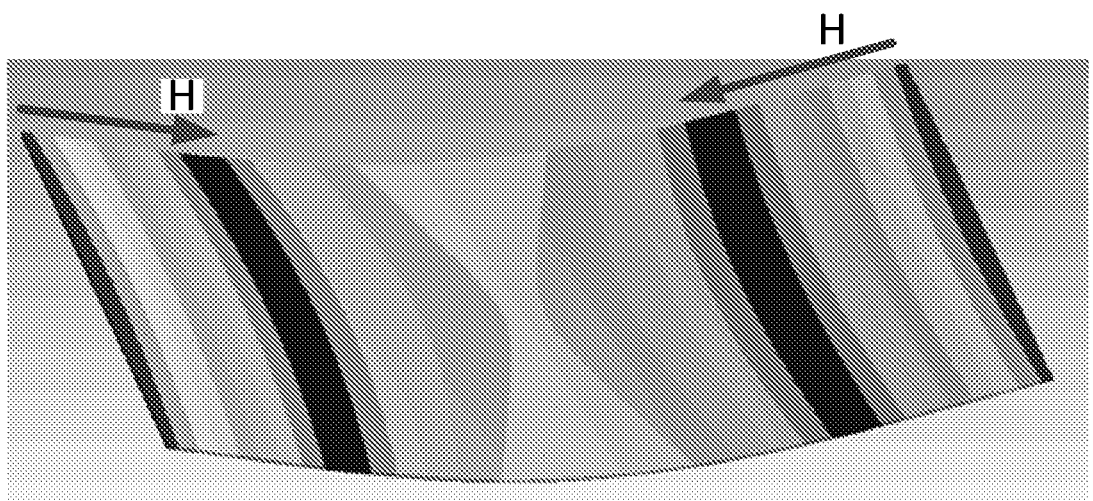
FIG. 11A-FIG. 11E are respectively schematic diagrams of characteristic mode displacement field distribution corresponding to 5 areas in FIG. 10.
Figure 11B:
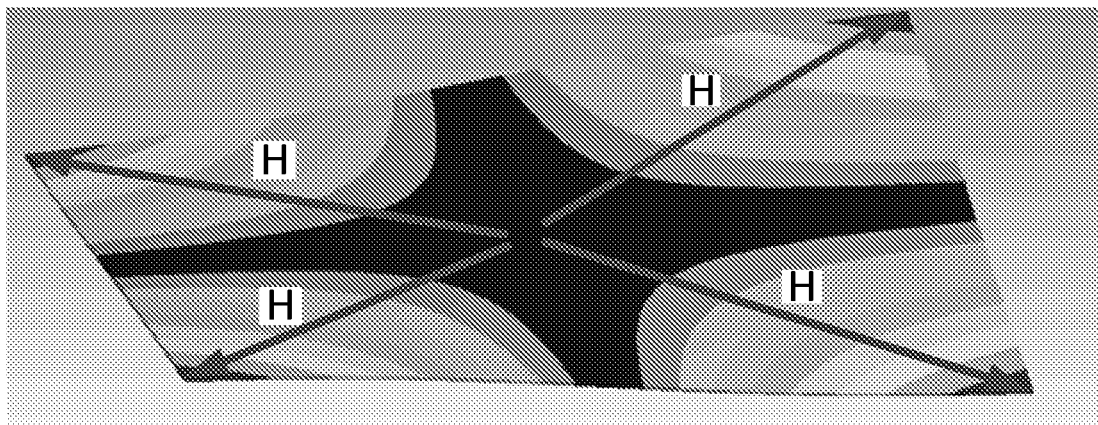
Figure 11C:
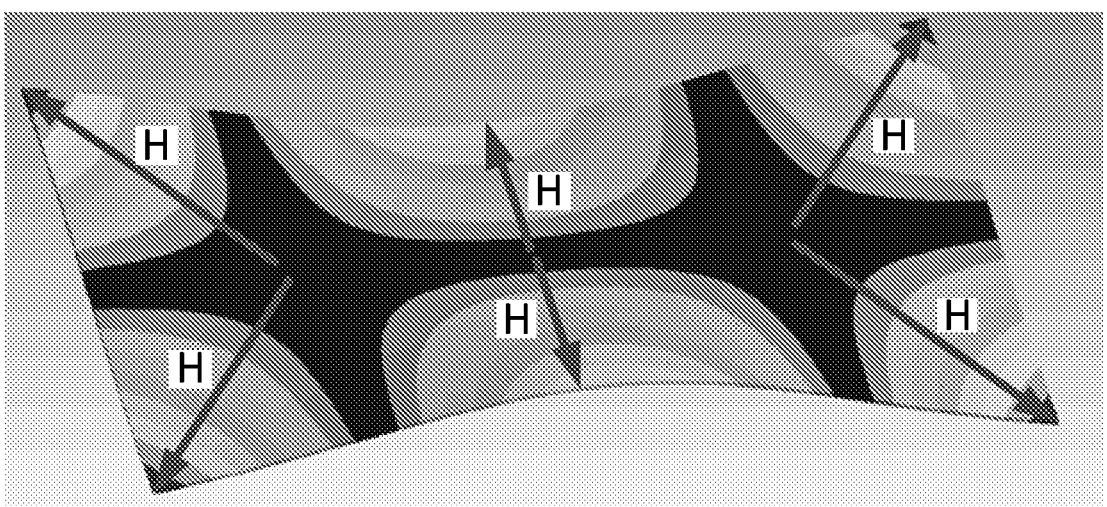
Figure 11D:
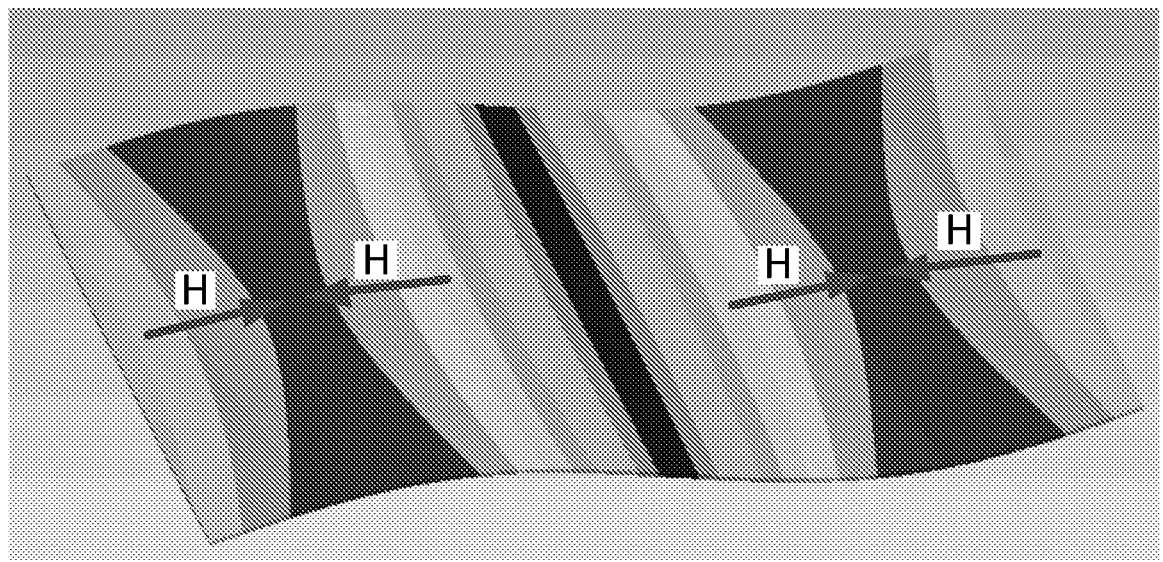
Figure 11E:
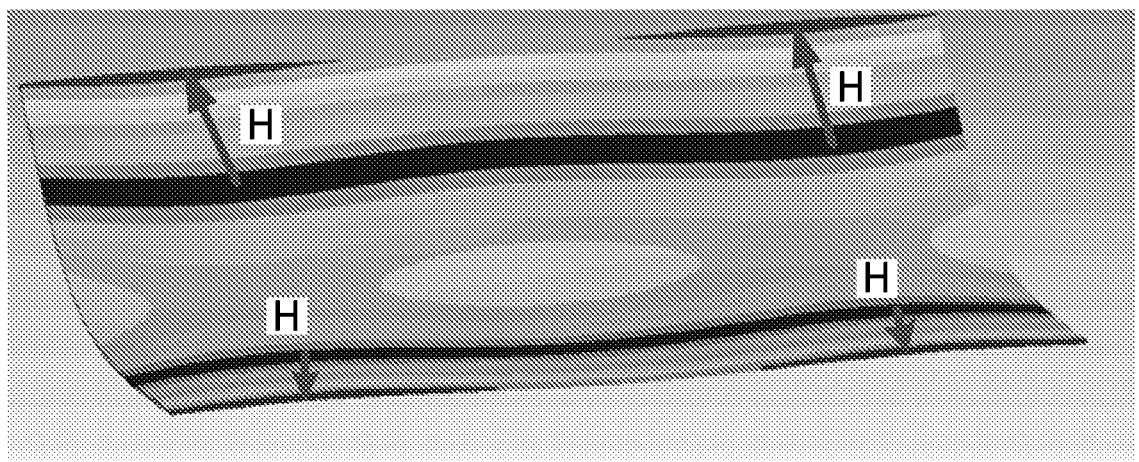

Specifically, the five characteristic frequency areas I, II, III, IV, and V in FIG. 10 correspond to vibration displacement field distribution of FIG. 11A-FIG. 11E respectively. The characteristic frequency of the base substrate 1 corresponding to the area I is 215 Hz. FIG. 11A is vibration displacement phase information of characteristic mode displacement field distribution of the base substrate 1 corresponding to the area I. When the piezoelectric devices on the base substrate 1 corresponding to the area I are loaded with voltage signals of 215 Hz, the vibration displacement amplitude distribution generated by the base substrate 1 is large. The characteristic frequency of the base substrate 1 corresponding to the area II is 261 Hz. FIG. 11B is the vibration displacement phase information of the characteristic mode displacement field distribution of the base substrate 1 corresponding to the area II. When the piezoelectric devices on the base substrate 1 corresponding to the area II are loaded with voltage signals of 261 Hz, the vibration displacement amplitude distribution generated by the base substrate 1 is large. The characteristic frequency of the base substrate 1 corresponding to the area III is 574 Hz. FIG. 11C is the vibration displacement phase information of the characteristic mode displacement field distribution of the base substrate 1 corresponding to the area III. When the piezoelectric devices on the base substrate 1 corresponding to the area III are loaded with voltage signals of 574 Hz, the vibration displacement amplitude distribution generated by the base substrate 1 is large. The characteristic frequency of the base substrate 1 corresponding to the area IV is 594 Hz. FIG. 11D is the vibration displacement phase information of the characteristic mode displacement field distribution of the base substrate 1 corresponding to the area IV. When the piezoelectric devices on the base substrate 1 corresponding to the area IV are loaded with voltage signals of 594 Hz, the vibration displacement amplitude distribution generated by the base substrate 1 is large. The characteristic frequency of the base substrate 1 corresponding to the area V is 800 Hz. FIG. 11E is the vibration displacement phase information of the characteristic mode displacement field distribution of the base substrate 1 corresponding to the area V. When the piezoelectric devices on the base substrate 1 corresponding to the area V are loaded with voltage signals of 800 Hz, the vibration displacement amplitude distribution generated by the base substrate 1 is large.

It should be noted that in the embodiment of the present disclosure, the glass base substrate of 117 mm*61 mm*0.5 mm is taken as an example for illustration, when the size of the base substrate changes, the corresponding characteristic mode displacement field distribution also changes, and partition of the base substrate may also change. The specific partition should be based on the principle that the selected characteristic mode can generate enough haptics effects within a full range of the base substrate.

Figure 12:
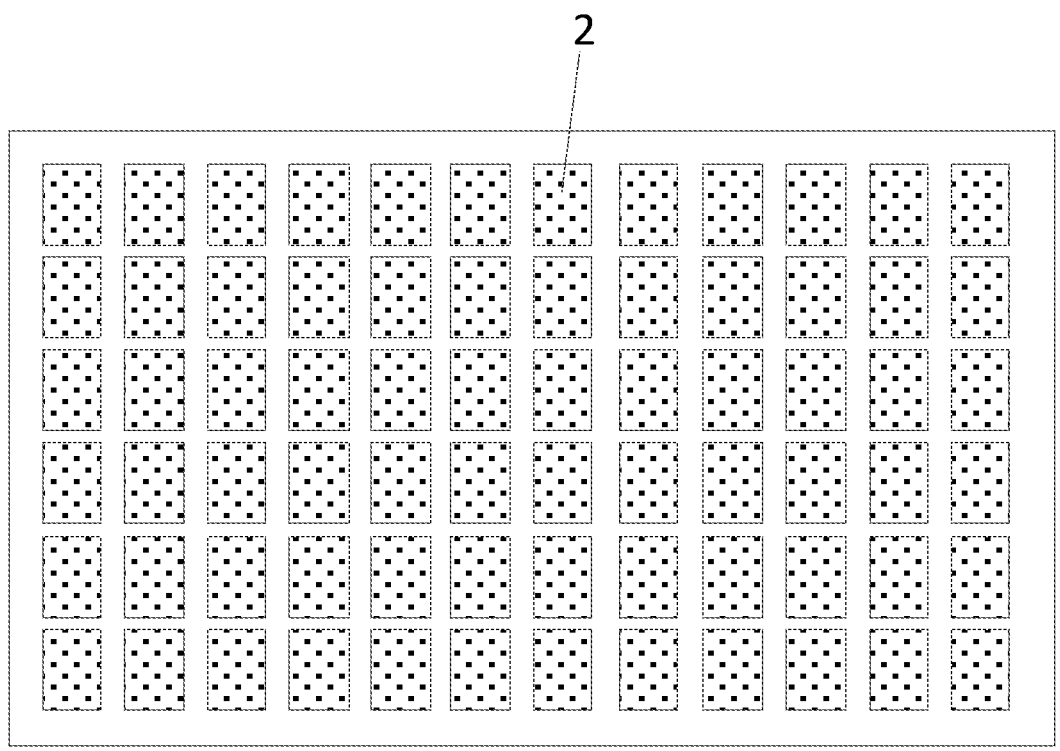
FIG. 12 is a schematic partition diagram of all piezoelectric devices on a base substrate corresponding to FIG. 11A.
Figure 16:
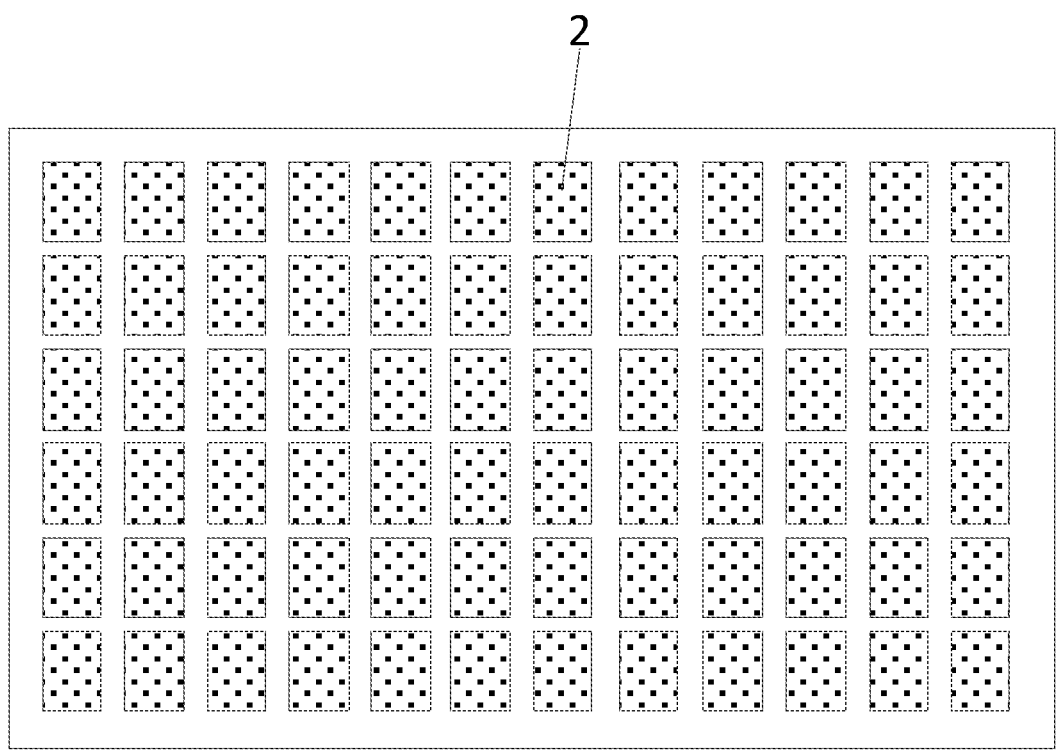
FIG. 16 is a schematic partition diagram of all piezoelectric devices on a base substrate corresponding to FIG. 11E.

During specific implementation, in the above driving method provided by the embodiment of the present disclosure, in above step S804, the dividing the plurality of piezoelectric devices arranged in the array and contained in the haptics panel into at least one vibration area according to the vibration displacement phase information of the characteristic mode displacement field distribution, specifically may include:

when it is determined that the vibration displacement phase information at each position of the base substrate has the same vibration displacement direction relative to an initial state of the base substrate, all piezoelectric devices contained in the haptics panel are divided into one vibration area. Specifically, as shown in FIG. 11A and FIG. 11E, FIG. 11A is the characteristic mode displacement field distribution of the base substrate 1 corresponding to the area I in FIG. 10, and FIG. 11E is the characteristic mode displacement field distribution of the base substrate 1 corresponding to the area V in FIG. 10. It can be seen that the vibration displacement phase information at each position of the base substrate contained in the characteristic mode displacement field distribution in FIG. 11A and FIG. 11E has the same vibration displacement direction relative to the initial state of the base substrate 1. Therefore, all piezoelectric devices contained in the haptics panel may be regarded as one vibration area. As shown in FIG. 12 and FIG. 16, FIG. 12 is a schematic partition diagram of all piezoelectric devices 2 on the base substrate 1 corresponding to FIG. 11A, and FIG. 16 is a schematic partition diagram of all piezoelectric devices 2 on the base substrate 1 corresponding to FIG. 11E. When the finger touches the haptics panel shown in FIG. 3, if an electric signal fed back by the touch layer 3 detects that the finger is in the area I in FIG. 10, according to the characteristic mode displacement field distribution of the base substrate 1 corresponding to the area I, all piezoelectric devices on the base substrate 1 are regarded as one vibration area, so that all piezoelectric devices 2 in FIG. 12 may be loaded with voltage signals with the same amplitudes and phases. Since the frequencies of the voltage signals loaded by the piezoelectric devices 2 are the same as the characteristic frequency (215 Hz) of the base substrate 1 corresponding to the area I, the piezoelectric devices on the base substrate 1 are excited by the voltage signals, which can make the area I where the finger is located generate strong haptics. When the finger touches the haptics panel shown in FIG. 3, if the electric signal fed back by the touch layer 3 detects that the finger is in the area V in FIG. 10, according to the characteristic mode displacement field distribution of the base substrate 1 corresponding to the area V, all piezoelectric devices on the base substrate 1 are regarded as one vibration area, so that all piezoelectric devices 2 in FIG. 16 may be loaded with voltage signals with the same amplitudes and phases. Since the frequencies of the voltage signals loaded by the piezoelectric devices 2 are the same as the characteristic frequency (800 Hz) of the base substrate 1 corresponding to the area V, when the piezoelectric devices 2 on the base substrate 1 are excited by the voltage signals, strong haptics may be generated in the area V where the finger is located.

During specific implementation, in the above driving method provided by the embodiment of the present disclosure, in above step S804, the dividing the plurality of piezoelectric devices arranged in the array and contained in the haptics panel into at least one vibration area according to the vibration displacement phase information of the characteristic mode displacement field distribution, specifically may include:

when it is determined that the vibration displacement phase information at each position of the base substrate has different vibration displacement directions relative to an initial state of the base substrate, dividing the plurality of piezoelectric devices corresponding to a successive area constituted at positions having the same vibration displacement direction into one vibration area. Specifically, as shown in FIG. 11B and FIG. 11D, FIG. 11B is the characteristic mode displacement field distribution of the base substrate 1 corresponding to the area II in FIG. 10, FIG. 11C is the characteristic mode displacement field distribution of the base substrate 1 corresponding to the area III in FIG. 10, and FIG. 11D is the characteristic mode displacement field distribution of the base substrate 1 corresponding to the area IV in FIG. 10. It can be seen that the vibration displacement phase information at each position of the base substrate contained in the characteristic mode displacement field distribution in FIG. 11B and FIG. 11D has different vibration displacement directions relative to an initial state of the base substrate 1, the plurality of piezoelectric devices 2 constituted at positions with the same vibration displacement direction may be divided into one vibration area. As shown in FIG. 13A-FIG. 15B, FIG. 13A and FIG. 13B are schematic partition diagrams of all piezoelectric devices 2 on the base substrate 1 corresponding to FIG. 11B, FIG. 14A and FIG. 14B are schematic partition diagrams of all piezoelectric devices 2 on the base substrate 1 corresponding to FIG. 11C, and FIG. 15A and FIG. 15B are schematic partition diagrams of all piezoelectric devices 2 on the base substrate 1 corresponding to FIG. 11D.

When the finger touches the haptics panel shown in FIG. 3, if the electric signal fed back by the touch layer 3 detects that the finger is in the area II in FIG. 10, according to the characteristic mode displacement field distribution of the base substrate 1 corresponding to the area II, all piezoelectric devices 2 on the base substrate 1 are divided into four vibration areas A, B, C and D (FIG. 13A and FIGS. 13B), A, B, C and D correspond to areas where orientations of four arrows H are located in FIG. 11B respectively, so that voltage signals with the same phases may be loaded on at least part of the piezoelectric devices 2 in each vibration area (A and D) with the same vibration displacement direction, the voltage signals with the same phases may be loaded on at least part of the piezoelectric devices 2 in each vibration area (B and C) with the same vibration displacement direction, and a difference between the phase of the voltage signals loaded by B and C and the phase of the voltage signals loaded by A and D is 180°.

When the finger touches the haptics panel shown in FIG. 3, if the electric signal fed back by the touch layer 3 detects that the finger is in the area III in FIG. 10, according to the characteristic mode displacement field distribution of the base substrate 1 corresponding to the area III, all piezoelectric devices 2 on the base substrate 1 are divided into six vibration areas A, B, C, D, E and F (FIG. 14A and FIGS. 14B), and A, B, C, D, E and F correspond to areas where orientations of six arrows H are located in FIG. 11C respectively, so that voltage signals with the same phases may be loaded on at least part of the piezoelectric devices 2 in each vibration area (A, C and E) with the same vibration displacement direction, the voltage signals with the same phases may be loaded on at least part of the piezoelectric devices 2 in each vibration area (B, D and F) with the same vibration displacement direction, and a difference between the phase of the voltage signals loaded by B, D and F and the phase of the voltage signals loaded by A, C and E is 180°.

When the finger touches the haptics panel shown in FIG. 3, if the electric signal fed back by the touch layer 3 detects that the finger is in the area IV in FIG. 10, according to the characteristic mode displacement field distribution of the base substrate 1 corresponding to the area IV, all piezoelectric devices 2 on the base substrate 1 are divided into two vibration areas A and B (FIG. 15A and FIG. 15B), A corresponds to areas where orientations of left three arrows H are located in FIGS. 11D, and B corresponds to areas where orientations of right three arrows H are located in FIG. 11D, so that voltage signals with the same phases may be loaded on at least part of the piezoelectric devices 2 in the vibration area A with the same vibration displacement direction, the voltage signals with the same phases may be loaded on at least part of the piezoelectric devices 2 in the vibration area B with the same vibration displacement direction, and a difference between the phase of the voltage signals loaded by A and the phase of the voltage signals loaded by B is 180°.

Figure 13A:
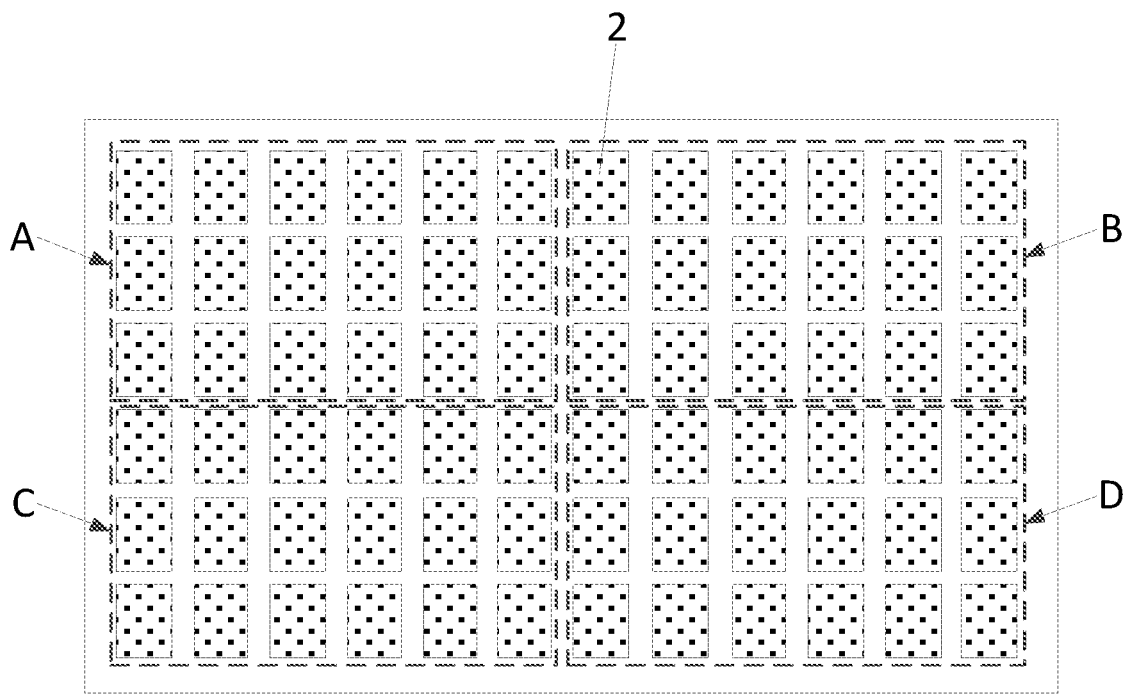
FIG. 13A and FIG. 13B are schematic partition diagrams of all piezoelectric devices on a base substrate corresponding to FIG. 11B.
Figure 14A:
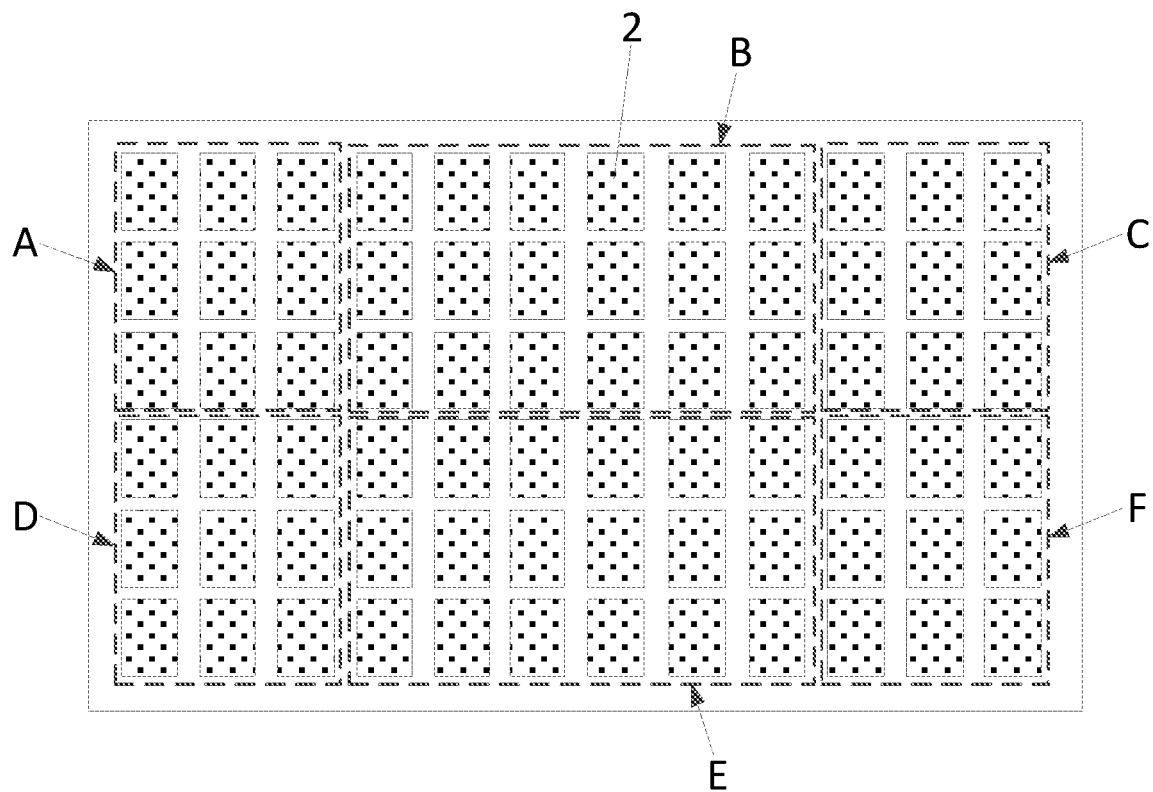
FIG. 14A and FIG. 14B are schematic partition diagrams of all piezoelectric devices on a base substrate corresponding to FIG. 11C.
Figure 14B:
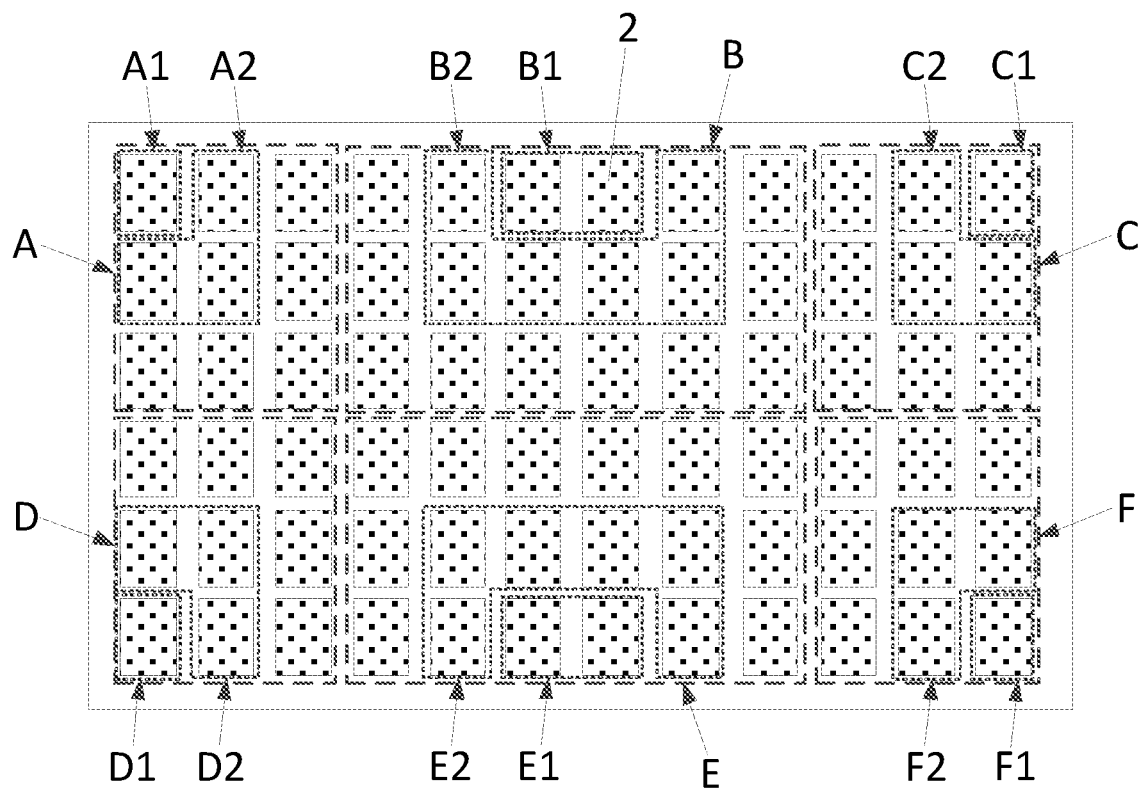
Figure 15A:
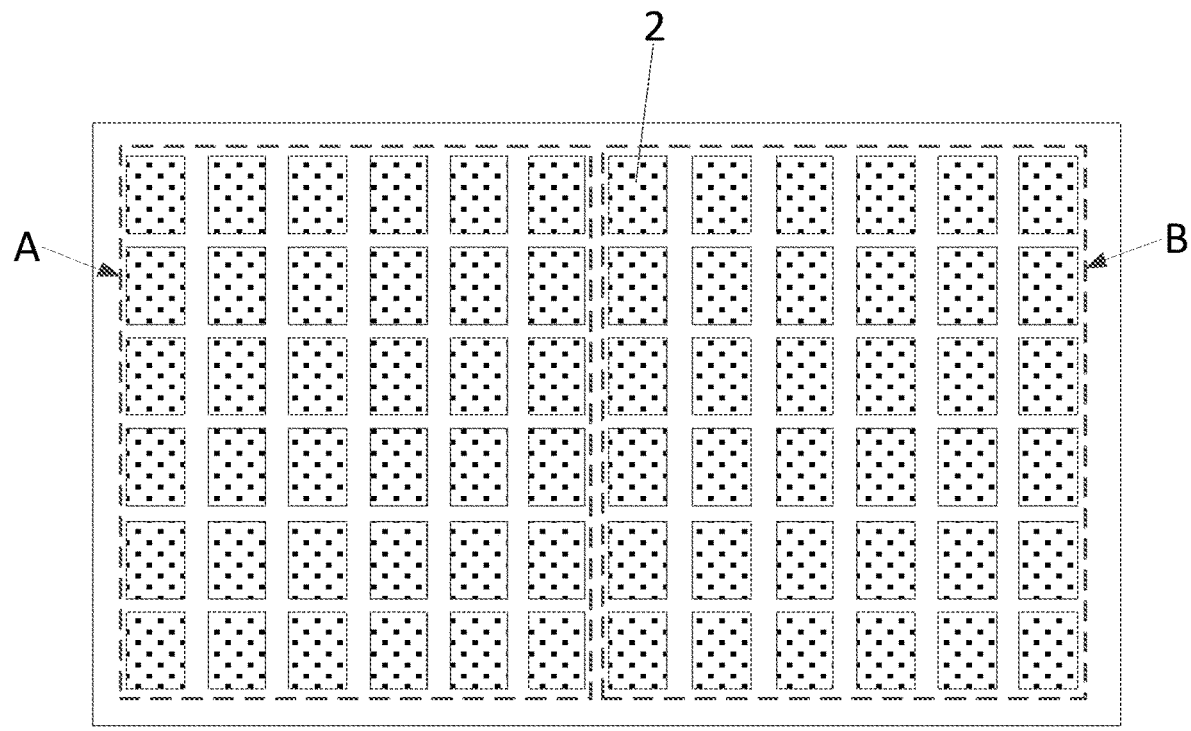
FIG. 15A and FIG. 15B are schematic partition diagrams of all piezoelectric devices on a base substrate corresponding to FIG. 11D.
Figure 15B:
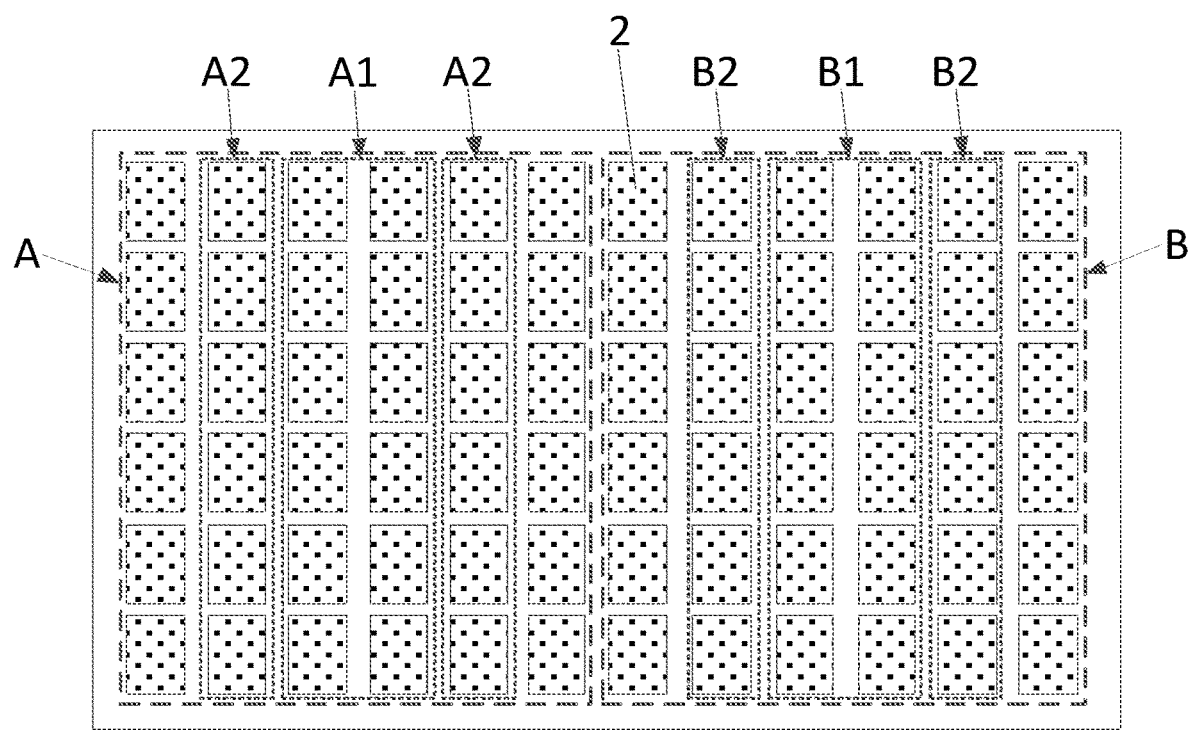

During specific implementation, in the above driving method provided by the embodiment of the present disclosure, as shown in FIG. 13A, FIG. 14A and FIG. 15A, the voltage signals with the same voltage amplitudes may be loaded on all piezoelectric devices 2 in all vibration areas. Specifically, as shown in FIG. 13A, voltage signals with the amplitude of Va are applied to all piezoelectric devices 2 in areas A and D, and voltage signals with the amplitude of Vb are applied to all piezoelectric devices 2 in areas B and C. The frequencies of Va and Vb are the same as the characteristic frequency (261 Hz) of the base substrate 1 corresponding to the area II, Vb=−Va, that is, the difference between the phase of the voltage signals loaded by B and C and the phase of the voltage signals loaded by A and D is 180°. When Va is greater than a certain voltage V0, the characteristic mode corresponding to the area II of the base substrate 1 can be excited (FIG. 11B). At this time, the base substrate 1 can generate enough haptics effects in the area II.

Therefore, when the piezoelectric devices 2 on the base substrate 1 are excited by the voltage signals, strong haptics may be generated in the area II where the finger is located. As shown in FIG. 14A, voltage signals with the amplitude of Va are applied to all piezoelectric devices 2 in areas A, C and E, and voltage signals with the amplitude of Vb are applied to all piezoelectric devices 2 in areas B, D and F. The frequencies of Va and Vb are the same as the characteristic frequency (574 Hz) of the base substrate 1 corresponding to the area III, Vb=−Va, that is, the difference between the phase of the voltage signals loaded by areas B, D and F and the phase of the voltage signals loaded by areas A, C and E is 180°. When Va is greater than a certain voltage V0, the characteristic mode corresponding to the area III of the base substrate 1 can be excited (FIG. 11C). At this time, the base substrate 1 can generate enough haptics effects in the area III. Therefore, when the piezoelectric devices 2 of the base substrate 1 are excited by the voltage signals, strong haptics may be generated in the area III where the finger is located. As shown in FIG. 15A, voltage signals with the amplitude of Va are applied to all piezoelectric devices 2 in the area A, and voltage signals with the amplitude of Vb are applied to all piezoelectric devices 2 in the area B. The frequencies of Va and Vb are the same as the characteristic frequency (594 Hz) of the base substrate 1 corresponding to the area IV, Vb=−Va, that is, the difference between the phase of the voltage signals loaded by B and the phase of the voltage signals loaded by A is 180°. When Va is greater than a certain voltage V0, the characteristic mode corresponding to the area IV of the base substrate 1 can be excited (FIG. 11D). At this time, the base substrate 1 can generate enough haptics effects in the area IV. Therefore, when the piezoelectric devices 2 of the base substrate 1 are excited by the voltage signals, strong haptics may be generated in the area IV where the finger is located.

Figure 13B:
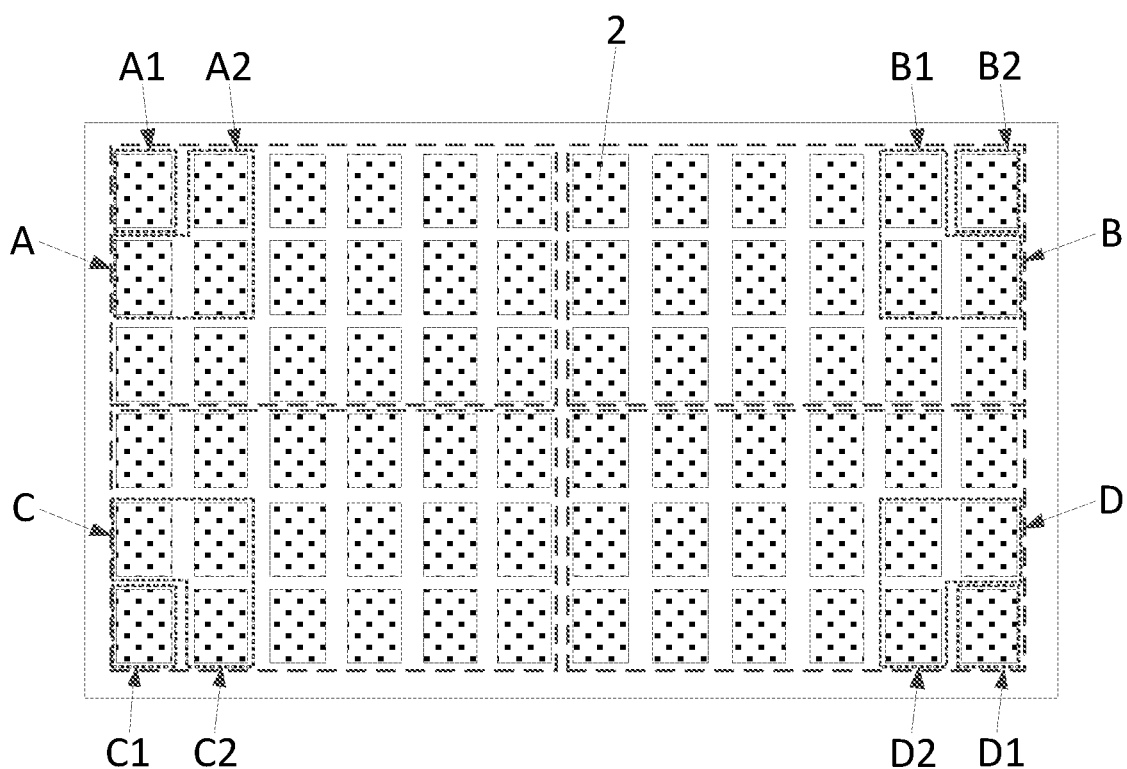

During specific implementation, in the above driving method provided by the embodiment of the present disclosure, as shown in FIG. 13B, FIG. 14B and FIG. 15B, each vibration area may be divided into a plurality of sub-areas according to the size of vibration displacement in FIG. 11B-FIG. 11D, and each sub-area corresponds to different vibration displacement amplitudes. For example, as shown in FIG. 13B, the vibration area A is divided into a plurality of sub-areas (A1, A2 . . . ), and the vibration displacement amplitudes corresponding to A1, A2 . . . gradually decrease; the vibration area B is divided into a plurality of sub-areas (B1, B2 . . . ), and the vibration displacement amplitudes corresponding to B1, B2 . . . gradually decrease; the vibration area C is divided into a plurality of sub-areas (C1, C2 . . . ), and the vibration displacement amplitudes corresponding to C1, C2 . . . gradually decrease; and the vibration area D is divided into a plurality of sub-areas (D1, D2 . . . ), and the vibration displacement amplitudes corresponding to D1, D2 . . . gradually decrease. As shown in FIG. 14B, the vibration area A is divided into a plurality of sub-areas (A1, A2 . . . ), and the vibration displacement amplitudes corresponding to A1, A2 . . . gradually decrease; the vibration area B is divided into a plurality of sub-areas (B1, B2 . . . ), and the vibration displacement amplitudes corresponding to B1, B2 . . . gradually decrease; the vibration area C is divided into a plurality of sub-areas (C1, C2 . . . ), and the vibration displacement amplitudes corresponding to C1, C2 . . . gradually decrease; and the vibration area D is divided into a plurality of sub-areas (D1, D2 . . . ), and the vibration displacement amplitudes corresponding to D1, D2 . . . gradually decrease; the vibration area E is divided into a plurality of sub-areas (E1, E2 . . . ), and the vibration displacement amplitudes corresponding to E1, E2 . . . gradually decrease; and the vibration area F is divided into a plurality of sub-areas (F1, F2 . . . ), and the vibration displacement amplitudes corresponding to F1, F2 . . . gradually decrease. As shown in FIG. 15B, the vibration area A is divided into a plurality of sub-areas (A1, A2 . . . ), and the vibration displacement amplitudes corresponding to A1, A2 . . . gradually decrease; and the vibration area B is divided into a plurality of sub-areas (B1, B2 . . . ), and the vibration displacement amplitudes corresponding to B1, B2 . . . gradually decrease.

The voltage signals may be loaded on the sub-area with the maximum vibration displacement amplitude in each vibration area in FIG. 13B, FIG. 14B and FIG. 15B, so that characteristic modes of FIG. 11B, FIG. 11C and FIG. 11D corresponding to the base substrate 1 can be excited, the base substrate 1 can generate enough haptics effects in the corresponding areas, and the voltage signals are only loaded on the sub-area with the maximum vibration displacement amplitude in each vibration area, which may reduce power consumption.

For example, as shown in FIG. 13B, voltage signals with the amplitude of Va1 are applied to the piezoelectric devices 2 in the sub-area A1 with the maximum vibration displacement amplitude in the vibration area A, voltage signals with the amplitude of Vb1 are applied to the piezoelectric devices 2 in the sub-area B1 with the maximum vibration displacement amplitude in the vibration area B, the voltage signals with the amplitude of Vb1 are applied to the piezoelectric devices 2 in the sub-area C1 with the maximum vibration displacement amplitude in the vibration area C, and the voltage signals with the amplitude of Va1 are applied to the piezoelectric devices 2 in the sub-area D1 with the maximum vibration displacement amplitude in the vibration area D. The frequencies of Va1 and Vb1 are the same as the characteristic frequency (261 Hz) of the base substrate 1 corresponding to the area II, Vb1=−Va1, that is, the difference between the phase of the voltage signals loaded by A1 and D1 and the phase of the voltage signals loaded by B1 and C1 is 180°. When Va is greater than a certain voltage V0, the characteristic mode corresponding to the area II of the base substrate 1 can be excited (FIG. 11B). At this time, the base substrate 1 can generate enough haptics effects in the area II.

As shown in FIG. 14B, voltage signals with the amplitude of Va1 are applied to the piezoelectric devices 2 in the sub-area A1 with the maximum vibration displacement amplitude in the vibration area A, voltage signals with the amplitude of Vb1 are applied to the piezoelectric devices 2 in the sub-area B1 with the maximum vibration displacement amplitude in the vibration area B, the voltage signals with the amplitude of Va1 are applied to the piezoelectric devices 2 in the sub-area C1 with the maximum vibration displacement amplitude in the vibration area C, the voltage signals with the amplitude of Vb1 are applied to the piezoelectric devices 2 in the sub-area D1 with the maximum vibration displacement amplitude in the vibration area D, the voltage signals the amplitude of Va1 are applied to the piezoelectric devices 2 in the sub-area E1 with the maximum vibration displacement amplitude in the vibration area E, and the voltage signals with the amplitude of Vb1 are applied to the piezoelectric devices 2 in the sub-area F1 with the maximum vibration displacement amplitude in the vibration area F. The frequencies of Va1 and Vb1 are the same as the characteristic frequency (574 Hz) of the base substrate 1 corresponding to the area III, Vb1=−Va1, that is, the difference between the phase of the voltage signals loaded by A1, C1 and E1 and the phase of the voltage signals loaded by B1, D1 and F1 is 180°. When Va is greater than a certain voltage V0, the characteristic mode corresponding to the area III of the base substrate 1 can be excited (FIG. 11C). At this time, the base substrate 1 can generate enough haptics effects in the area III.

As shown in FIG. 15B, voltage signals with the amplitude of Va1 are applied to the piezoelectric devices 2 in the sub-area A1 with the maximum vibration displacement amplitude in the vibration area A, and voltage signals with the amplitude of Vb1 are applied to the piezoelectric devices 2 in the sub-area B1 with the maximum vibration displacement amplitude in the vibration area B. The frequencies of Va1 and Vb1 are the same as the characteristic frequency (594 Hz) of the base substrate 1 corresponding to the area IV, Vb1=−Va1, that is, the difference between the phase of the voltage signals loaded by A1 and the phase of the voltage signals loaded by B1 is 180°. When Va is greater than a certain voltage V0, the characteristic mode corresponding to the area IV of the base substrate 1 can be excited (FIG. 11D). At this time, the base substrate 1 can generate enough haptics effects in the area IV.

The above is to load the voltage signals only on the sub-area with the maximum vibration displacement amplitude in each vibration area, and of course, the voltage signals may also be loaded on the sub-areas with the maximum and the second maximum vibration displacement amplitudes in each vibration area. For example, as shown in FIG. 13B, voltage signals with the amplitude of Va1 are applied to the piezoelectric devices 2 in a sub-area A1 with the maximum vibration displacement amplitude and a sub-area A2 with the second maximum vibration displacement amplitude in the vibration area A, voltage signals with the amplitude of Vb1 are applied to the piezoelectric devices 2 in a sub-area B1 with the maximum vibration displacement amplitude and a sub-area B2 with the second maximum vibration displacement amplitude in the vibration area B, the voltage signals with the amplitude of Vb1 are applied to the piezoelectric devices 2 in a sub-area C1 with the maximum vibration displacement amplitude and a sub-area C2 with the second maximum vibration displacement amplitude in the vibration area C, and the voltage signals with the amplitude of Va1 are applied to the piezoelectric devices 2 in a sub-area D1 with the maximum vibration displacement amplitude and a sub-area D2 with the second maximum vibration displacement amplitude in the vibration area D. The frequencies of Va1 and Vb1 are the same as the characteristic frequency (261 Hz) of the base substrate 1 corresponding to the area II, Vb1=−Va1, that is, the difference between the phase of the voltage signals loaded by A1 and D1 and the phase of the voltage signals loaded by B1 and C1 is 180°. When Va is greater than a certain voltage V0, the characteristic mode corresponding to the area II of the base substrate 1 can be excited (FIG. 11B). At this time, the base substrate 1 can generate enough haptics effects in the area II.

As shown in FIG. 14B, voltage signals with the amplitude of Va1 are applied to the piezoelectric devices 2 in the sub-area A1 with the maximum vibration displacement amplitude and the sub-area A2 with the second maximum vibration displacement amplitude in the vibration area A, voltage signals with the amplitude of Vb1 are applied to the piezoelectric devices 2 in the sub-area B1 with the maximum vibration displacement amplitude and the sub-area B2 with the second maximum vibration displacement amplitude in the vibration area B, the voltage signals with the amplitude of Va1 are applied to the piezoelectric devices 2 in the sub-area C1 with the maximum vibration displacement amplitude and the sub-area C2 with the second maximum vibration displacement amplitude in the vibration area C, the voltage signals with the amplitude of Vb1 are applied to the piezoelectric devices 2 in the sub-area D1 with the maximum vibration displacement amplitude and the sub-area D2 with the second maximum vibration displacement amplitude in the vibration area D, the voltage signals the amplitude of Va1 are applied to the piezoelectric devices 2 in a sub-area E1 with the maximum vibration displacement amplitude and a sub-area E2 with the second maximum vibration displacement amplitude in the vibration area E, and the voltage signals with the amplitude of Vb1 are applied to the piezoelectric devices 2 in a sub-area F1 with the maximum vibration displacement amplitude and a sub-area F2 with the second maximum vibration displacement amplitude in the vibration area F. The frequencies of Va1 and Vb1 are the same as the characteristic frequency (574 Hz) of the base substrate 1 corresponding to the area III, Vb1=−Va1, that is, the difference between the phase of the voltage signals loaded by A1, A2, C1, C2, E1 and E2 and the phase of the voltage signals loaded by B1, B2, D1, D2, F1 and F2 is 180°. When Va is greater than a certain voltage V0, the characteristic mode corresponding to the area III of the base substrate 1 can be excited (FIG. 11C). At this time, the base substrate 1 can generate enough haptics effects in the area III.

As shown in FIG. 15B, voltage signals with the amplitude of Va1 are applied to the piezoelectric devices 2 in the sub-area A1 with the maximum vibration displacement amplitude and the sub-area A2 with the second maximum vibration displacement amplitude in the vibration area A, and voltage signals with the amplitude of Vb1 are applied to the piezoelectric devices 2 in the sub-area B1 with the maximum vibration displacement amplitude and the sub-area B2 with the second maximum vibration displacement amplitude in the vibration area B. The frequencies of Va1 and Vb1 are the same as the characteristic frequency (594 Hz) of the base substrate 1 corresponding to the area IV, Vb1=−Va1, that is, the difference between the phase of the voltage signals loaded by A1 and A2 and the phase of the voltage signals loaded by B1 and B2 is 180°. When Va is greater than a certain voltage V0, the characteristic mode corresponding to the area IV of the base substrate 1 can be excited (FIG. 11D). At this time, the base substrate 1 can generate enough haptics effects in the area IV.

During specific implementation, since the areas with the large vibration displacement amplitudes should be loaded with corresponding large voltage signals, in the above driving method provided by the embodiment of the present disclosure, and as shown in FIG. 13B, FIG. 14B and FIG. 15B, voltage signals with different voltage amplitudes may be loaded on each sub-area according to the vibration displacement amplitude in a vibration area. For example, as shown in FIG. 13B, the voltage signals with different voltage amplitudes are loaded on the sub-areas A1, A2 . . . according to the vibration displacement amplitude in the vibration area A, the voltage signals with different voltage amplitudes are loaded on the sub-areas B1, B2 . . . according to the vibration displacement amplitude in the vibration area B, the voltage signals with different voltage amplitudes are loaded on the sub-areas C1, C2 . . . according to the vibration displacement amplitude in the vibration area C, and the voltage signals with different voltage amplitudes are loaded on the sub-areas D1, D2 . . . according to the vibration displacement amplitude in the vibration area D. As shown in FIG. 14B, the voltage signals with different voltage amplitudes are loaded on the sub-areas A1, A2 . . . according to the vibration displacement amplitude in the vibration area A, the voltage signals with different voltage amplitudes are loaded on the sub-areas B1, B2 . . . according to the vibration displacement amplitude in the vibration area B, the voltage signals with different voltage amplitudes are loaded on the sub-areas C1, C2 . . . according to the vibration displacement amplitude in the vibration area C, the voltage signals with different voltage amplitudes are loaded on the sub-areas D1, D2 . . . according to the vibration displacement amplitude in the vibration area D, the voltage signals with different voltage amplitudes are loaded on the sub-areas E1, E2 . . . according to the vibration displacement amplitude in the vibration area E, and the voltage signals with different voltage amplitudes are loaded on the sub-areas F1, F2 . . . according to the vibration displacement amplitude in the vibration area F. As shown in FIG. 15B, the voltage signals with different voltage amplitudes are loaded on the sub-areas A1, A2 . . . according to the vibration displacement amplitude in the vibration area A, and the voltage signals with different voltage amplitudes are loaded on the sub-areas B1, B2 . . . according to the vibration displacement amplitude in the vibration area B.

During specific implementation, in the above driving method provided by the embodiment of the present disclosure, as shown in FIG. 13B, FIG. 14B and FIG. 15B, voltage signals with decreasing voltage amplitudes step by step are loaded respectively from the sub-area with the maximum vibration displacement amplitude to a sub-area with a minimum vibration displacement amplitude.

For example, as shown in FIG. 13B, the voltage signals with the decreasing voltage amplitudes step by step are loaded on the sub-areas A1, A2 . . . from the sub-area A1 with the maximum vibration displacement amplitude to the sub-area with the minimum vibration displacement amplitude, the voltage signals with the decreasing voltage amplitudes step by step are loaded on the sub-areas B1, B2 . . . from the sub-area B1 with the maximum vibration displacement amplitude to the sub-area with the minimum vibration displacement amplitude, the voltage signals with the decreasing voltage amplitudes step by step are loaded on the sub-areas C1, C2 . . . from the sub-area C1 with the maximum vibration displacement amplitude to the sub-area with the minimum vibration displacement amplitude, and the voltage signals with the decreasing voltage amplitudes step by step are loaded on the sub-areas D1, D2 . . . from the sub-area D1 with the maximum vibration displacement amplitude to the sub-area with the minimum vibration displacement amplitude. For example, the voltage signals with the amplitude of Va1 are applied to the piezoelectric devices 2 in the sub-areas A1 and D1, voltage signals with the amplitude of Va2 are applied to the piezoelectric devices 2 in the sub-areas A2 and D2, the voltage signals with the amplitude of Vb1 are applied to the piezoelectric devices 2 in the sub-areas B1 and C1, voltage signals with the amplitude of Vb2 are applied to the piezoelectric devices 2 in the sub-areas B2 and C2, Va1>Va2, Vb1=−Va1, and Vb2=−Va2, that is, the difference between the phase of the voltage signals in the areas B1 and C1 and the phase of the voltage signals in the areas A1 and D1 is 180°, and the difference between the phase of the voltage signals in the areas B2 and C2 and the phase of the voltage signals in the areas A2 and D2 is 180°. When Va1 is greater than a certain voltage V1, Va2 is greater than a certain voltage V2, and the frequencies of the voltage signals are the same as the characteristic frequency (261 Hz) of the base substrate 1 corresponding to the area II, the characteristic mode corresponding to the area II of the base substrate 1 can be excited (FIG. 11B). At this time, the base substrate 1 can generate enough haptics effects in the area II.

As shown in FIG. 14B, the voltage signals with the decreasing voltage amplitudes step by step are loaded on the sub-areas A1, A2 . . . from the sub-area A1 with the maximum vibration displacement amplitude to the sub-area with the minimum vibration displacement amplitude, the voltage signals with the decreasing voltage amplitudes step by step are loaded on the sub-areas B1, B2 . . . from the sub-area B1 with the maximum vibration displacement amplitude to the sub-area with the minimum vibration displacement amplitude, the voltage signals with the decreasing voltage amplitudes step by step are loaded on the sub-areas C1, C2 . . . from the sub-area C1 with the maximum vibration displacement amplitude to the sub-area with the minimum vibration displacement amplitude, the voltage signals with the decreasing voltage amplitudes step by step are loaded on the sub-areas D1, D2 . . . from the sub-area D1 with the maximum vibration displacement amplitude to the sub-area with the minimum vibration displacement amplitude, the voltage signals with the decreasing voltage amplitudes step by step are loaded on the sub-areas E1, E2 . . . from the sub-area E1 with the maximum vibration displacement amplitude to the sub-area with the minimum vibration displacement amplitude, and the voltage signals with the decreasing voltage amplitudes step by step are loaded on the sub-areas F1, F2 . . . from the sub-area F1 with the maximum vibration displacement amplitude to the sub-area with the minimum vibration displacement amplitude. For example, the voltage signals with the amplitude of Va1 are applied to the piezoelectric devices 2 in the sub-areas A1, C1 and E1, the voltage signals with the amplitude of Va2 are applied to the piezoelectric devices 2 in the sub-areas A2, C2 and E2, the voltage signals with the amplitude of Vb1 are applied to the piezoelectric devices 2 in the sub-areas B1, D1 and F1, the voltage signals with the amplitude of Vb2 are applied to the piezoelectric devices 2 in the sub-areas B2, D2 and F2, Va1>Va2, Vb1=−Va1, and Vb2=−Va2, that is, the difference between the phase of the voltage signals in the areas A1, C1 and E1 and the phase of the voltage signals in the areas B1, D1 and F1 is 180°, and the difference between the phase of the voltage signals in the areas A2, C2 and E2 and the phase of the voltage signals in the areas B2, D2 and F2 is 180°. When Va1 is greater than a certain voltage V1, Va2 is greater than a certain voltage V2, and the frequencies of the voltage signals are the same as the characteristic frequency (574 Hz) of the base substrate 1 corresponding to the area III, the characteristic mode corresponding to the area III of the base substrate 1 can be excited (FIG. 11C). At this time, the base substrate 1 can generate enough haptics effects in the area III.

As shown in FIG. 15B, the voltage signals with the decreasing voltage amplitudes step by step are loaded on the sub-areas A1, A2 . . . from the sub-area A1 with the maximum vibration displacement amplitude to the sub-area with the minimum vibration displacement amplitude, and the voltage signals with the decreasing voltage amplitudes step by step are loaded on the sub-areas B1, B2 . . . from the sub-area B1 with the maximum vibration displacement amplitude to the sub-area with the minimum vibration displacement amplitude. For example, the voltage signals with the amplitude of Va1 are applied to the piezoelectric devices 2 in the sub-area A1, the voltage signals with the amplitude of Va2 are applied to the piezoelectric devices 2 in the sub-area A2, the voltage signals with the amplitude of Vb1 are applied to the piezoelectric devices 2 in the sub-area B1, the voltage signals with the amplitude of Vb2 are applied to the piezoelectric devices 2 in the sub-area B2, Va1>Va2, Vb1=−Va1, and Vb2=−Va2, that is, the difference between the phase of the voltage signals in the area B1 and the phase of the voltage signals in the area A1 is 180°, and the difference between the phase of the voltage signals in the area B2 and the phase of the voltage signals in the area A2 is 180°. When Va1 is greater than a certain voltage V1, Va2 is greater than a certain voltage V2, and the frequencies of the voltage signals are the same as the characteristic frequency (594 Hz) of the base substrate 1 corresponding to the area IV, the characteristic mode corresponding to the area IV of the base substrate 1 can be excited (FIG. 11D). At this time, the base substrate 1 can generate enough haptics effects in the area IV.

To sum up, according to the embodiment of the present disclosure, the strong haptics effect is realized by using resonance generated by the base substrate at the characteristic frequency, and the partition control of the piezoelectric devices is realized by partitioning the piezoelectric devices. When a signal to activate haptics is monitored, the corresponding characteristic mode that can generate enough haptics is selected according to the touch position of the finger, and the corresponding characteristic mode is excited by applying the voltage signals with a certain phase difference to the piezoelectric devices in different areas, so that the area where the finger is located generates the strong haptics effect.

Based on the same inventive concept, an embodiment of the present disclosure further provides a haptics apparatus, including the above haptics panel provided by the embodiment of the present disclosure. Since the principle for solving problems of the haptics apparatus is similar to that of the aforementioned haptics panel, the implementation of the haptics apparatus may refer to the implementation of the aforementioned haptics panel, and repetitions are omitted here. The haptics apparatus may be a mobile phone, a tablet computer, a television, a display, a laptop, a digital photo frame, a navigator and any product or component with a display or touch function.

During specific implementation, the above haptics apparatus provided by the embodiment of the present disclosure may further include other film layers familiar to those skilled in the art, which will not be detailed here.

During specific implementation, the haptics apparatus may determine the position of human touch, thus generating corresponding vibration waveform, amplitude and frequency, and human-computer interaction can be realized. Of course, the haptics apparatus may further be applied to medicine, automotive electronics, motion tracking systems and other fields according to the actual needs, which will not be detailed here.

The embodiments of the present disclosure provide the haptics panel and the driving method thereof, and the haptics apparatus. First, the base substrate is divided into a variety of characteristic frequency areas, by detecting the touch position of the user (such as a finger) on the haptics panel, the characteristic frequency area to which the touch position belongs is determined, and all piezoelectric devices are divided into at least one vibration area according to the characteristic mode displacement field distribution corresponding to the characteristic frequency areas, and then, the voltage signals with frequencies the same as the characteristic frequency of the base substrate corresponding to the determined characteristic frequency area to which the touch position belongs are loaded on at least part of the piezoelectric devices in each vibration area. In this way, when the finger is located at different touch positions, different characteristic modes of the base substrate may be excited by using the piezoelectric devices, so that the finger can feel a strong haptics effect at any position of the haptics panel.

Although the preferred embodiments of the present disclosure have been described, those skilled in the art can make additional changes and modifications to these embodiments once they know the basic creative concept. So, the appended claims are intended to be construed to include the preferred embodiments and all changes and modifications that fall within the scope of the present disclosure.

Apparently, those skilled in the art can make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A driving method of a haptics panel, comprising:
   receiving a touch signal, and judging a touch position of a user on the haptics panel according to the touch signal;
   judging a characteristic frequency area to which the touch position belongs, wherein the characteristic frequency area is one of a variety of characteristic frequency areas into which a base substrate of the haptics panel is divided according to a size of the base substrate of the haptics panel, the base substrate corresponding to a same characteristic frequency area has a same characteristic frequency, and the base substrate corresponding to different characteristic frequency areas has different characteristic frequencies;
   determining characteristic mode displacement field distribution of the base substrate according to the characteristic frequency area to which the touch position belongs, wherein the characteristic mode displacement field distribution contains vibration displacement phase information at each position of the base substrate;
   determining a plurality of piezoelectric devices arranged in an array and contained in the haptics panel to be in at least one vibration area according to the vibration displacement phase information of the characteristic mode displacement field distribution; and
   loading voltage signals on at least part of the piezoelectric devices in the vibration area, wherein frequencies of the voltage signals loaded in all vibration areas are the same as the characteristic frequency of the base substrate corresponding to the characteristic frequency area to which the touch position belongs, phases of voltage signals loaded in the same vibration area are the same, and phases of voltage signals loaded in every two adjacent vibration areas are different.

2. The driving method according to claim 1, wherein the determining the plurality of piezoelectric devices arranged in the array and contained in the haptics panel to be in at least one vibration area according to the vibration displacement phase information of the characteristic mode displacement field distribution, comprises:
   when it is determined that the vibration displacement phase information at each position of the base substrate has the same vibration displacement direction relative to an initial state of the base substrate, determining all piezoelectric devices contained in the haptics panel to be in one vibration area.

3. The driving method according to claim 2, wherein the loading the voltage signals on at least part of the piezoelectric devices in the vibration area, comprises: loading voltage signals with the same voltage amplitudes and phases on all piezoelectric devices in the vibration area.

4. The driving method according to claim 1, wherein the determining the plurality of piezoelectric devices arranged in the array and contained in the haptic panel to be in at least one vibration area according to the vibration displacement phase information of the characteristic mode displacement field distribution, comprises:

when it is determined that the vibration displacement phase information at each position of the base substrate has different vibration displacement directions relative to an initial state of the base substrate, determining the plurality of piezoelectric devices corresponding to a successive area constituted at positions having the same vibration displacement direction to be in one vibration area.

5. The driving method according to claim 4, wherein the loading the voltage signals on at least part of the piezoelectric devices in the vibration area, comprises: loading voltage signals with the same phases on at least part of the piezoelectric devices in each vibration area with the same vibration displacement direction, and loading voltage signals with a 180° phase difference on at least part of the piezoelectric devices in each vibration area with different vibration displacement directions.

6. The driving method according to claim 5, further comprising: loading voltage signals with the same voltage amplitudes on all piezoelectric devices in all vibration areas.

7. The driving method according to claim 5, wherein each vibration area is divided into a plurality of sub-areas according to a size of vibration displacement, and each sub-area corresponds to different vibration displacement amplitudes; and the method further comprises:

loading a voltage signal on a sub-area with a maximum vibration displacement amplitude in each vibration area.

8. The driving method according to claim 5, wherein each vibration area is divided into a plurality of sub-areas according to a size of vibration displacement, and each sub-area corresponds to different vibration displacement amplitudes; and the method further comprises:

loading voltage signals with different voltage amplitudes on each sub-area in one vibration area according to the vibration displacement amplitudes.

9. The driving method according to claim 8, further comprising: loading voltage signals with decreasing voltage amplitudes step by step respectively from the sub-area with the maximum vibration displacement amplitude to a sub-area with a minimum vibration displacement amplitude.

10. A haptics panel, driven by the driving method according to claim 1, wherein the haptics panel comprises a base substrate, a plurality of piezoelectric devices located on one side of the base substrate and arranged in an array, and a touch layer located on one side of the base substrate facing away from the piezoelectric devices; and the piezoelectric devices are configured to vibrate under drive of voltage signals to drive the base substrate to vibrate.

11. The haptics panel according to claim 10, further comprising a supporting layer located on the base substrate, wherein the supporting layer and the piezoelectric devices are located on the same side of the base substrate.

12. The haptics panel according to claim 11, wherein the supporting layer comprises first supporting parts located around the base substrate and arranged surrounding the piezoelectric devices.

13. The haptics panel according to claim 12, wherein a plurality of first supporting parts are arranged and independent of one another.

14. The haptics panel according to claim 13, wherein the first supporting parts comprise first sub-supporting parts, the first sub-supporting parts are arranged at four corners of the base substrate, and a shape of each first sub-supporting part is an L shape.

15. The haptics panel according to claim 13, wherein the first supporting parts further comprise second sub-supporting parts, and a central area of each side edge of the base substrate is provided with at least one second sub-supporting part;

wherein when the central area of each side edge of the base substrate is provided with a plurality of second sub-supporting parts, and the plurality of second sub-supporting parts are symmetrically arranged with respect to a central point of each side edge of the base substrate.

16. The haptics panel according to claim 11, wherein the supporting layer comprises a plurality of second supporting parts arranged at gaps of the piezoelectric devices.

17. The haptics panel according to claim 15, wherein a shape of an orthographic projection of the supporting layer on the base substrate comprises a square, a triangle, a circle, a trapezoid or a polygon.

18. The haptics panel according to claim 12, wherein the first supporting parts are of successive annular structures.

19. The haptics panel according to claim 11, wherein a material of the supporting layer comprises at least one of: rubber, bubble and foam;

wherein a material of the supporting layer comprises polydimethylsiloxane.

20. A haptics apparatus, comprising a haptics panel driven by the method according to claim 1, wherein the haptics panel comprises a base substrate, a plurality of piezoelectric devices located on one side of the base substrate and arranged in an array, and a touch layer located on one side of the base substrate facing away from the piezoelectric devices; and the piezoelectric devices are configured to vibrate under drive of voltage signals to drive the base substrate to vibrate.

* * * * *